US010634884B2

(12) United States Patent
Takada et al.

(10) Patent No.: US 10,634,884 B2
(45) Date of Patent: Apr. 28, 2020

(54) IMAGE PICKUP APPARATUS AND OPTICAL APPARATUS USING THE SAME

(71) Applicant: OLYMPUS CORPORATION, Hachioji-shi, Tokyo (JP)

(72) Inventors: Keisuke Takada, Kokubunji (JP); Yoshihiro Uchida, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 110 days.

(21) Appl. No.: 15/954,265

(22) Filed: Apr. 16, 2018

(65) Prior Publication Data

US 2018/0231747 A1 Aug. 16, 2018

Related U.S. Application Data

(63) Continuation of application No. PCT/JP2015/080001, filed on Oct. 23, 2015.

(51) Int. Cl.
*G02B 13/04* (2006.01)
*G02B 1/04* (2006.01)
*G02B 9/12* (2006.01)
*G02B 13/00* (2006.01)

(52) U.S. Cl.
CPC ............. *G02B 13/04* (2013.01); *G02B 1/041* (2013.01); *G02B 9/12* (2013.01); *G02B 13/0035* (2013.01)

(58) Field of Classification Search
CPC ...................................... G02B 13/04
USPC ........................................ 359/716
See application file for complete search history.

(56) References Cited

U.S. PATENT DOCUMENTS

| 5,223,982 | A | 6/1993 | Suzuki et al. |
| 5,436,767 | A | 7/1995 | Suzuki et al. |
| 6,118,590 | A | 9/2000 | Chiba |
| 6,476,851 | B1 | 11/2002 | Nakamura |
| 2005/0225872 | A1 | 10/2005 | Uzawa et al. |
| 2007/0014033 | A1 | 1/2007 | Shinohara |
| 2008/0080065 | A1 | 4/2008 | Asami |
| 2009/0141364 | A1 | 6/2009 | Baba |

(Continued)

FOREIGN PATENT DOCUMENTS

| JP | 05107470 A | 4/1993 |
| JP | 10170821 A | 6/1998 |

(Continued)

OTHER PUBLICATIONS

International Search Report (ISR) dated Dec. 8, 2015 issued in International Application No. PCT/JP2015/080001.

(Continued)

*Primary Examiner* — James C. Jones
(74) *Attorney, Agent, or Firm* — Holtz, Holtz & Volek PC

(57) ABSTRACT

An image pickup apparatus includes an optical system which includes a plurality of lenses, and an image sensor which is disposed at an image position of the optical system, wherein the optical system includes in order from an object side, a first lens having a negative refractive power, a second lens having a positive refractive power, an aperture stop, and a third lens, and each of the first lens, the second lens, and the third lens is formed of a material having a refractive index not higher than 1.70, and the following conditional expressions (1) and (2) are satisfied:

$2.0 < \Sigma d/FL < 5.5$ (1), and $0.5 < \Phi 1L/IH < 3.0$ (2).

20 Claims, 15 Drawing Sheets

(56) References Cited

U.S. PATENT DOCUMENTS

| | | | |
|---|---|---|---|
| 2011/0249349 A1 | 10/2011 | Asami | |
| 2011/0286112 A1 | 11/2011 | Orihara et al. | |
| 2012/0016199 A1 | 1/2012 | Baba et al. | |
| 2013/0278714 A1* | 10/2013 | Hirose | G02B 13/04 |
| | | | 348/36 |

FOREIGN PATENT DOCUMENTS

| | | | |
|---|---|---|---|
| JP | 10239594 A | 9/1998 |
| JP | 11271607 A | 10/1999 |
| JP | 2000187155 A | 7/2000 |
| JP | 2004337346 A | 12/2004 |
| JP | 2007011237 A | 1/2007 |
| JP | 2009136387 A | 6/2009 |
| JP | 2010107815 A | 5/2010 |
| JP | 2010246906 A | 11/2010 |
| JP | 4815319 B2 | 11/2011 |
| JP | 2011237750 A | 11/2011 |
| WO | 2011027622 A1 | 3/2011 |

OTHER PUBLICATIONS

Written Opinion dated Dec. 8, 2015 issued in International Application No. PCT/JP2015/080001.

International Preliminary Report on Patentability (IPRP) (and English language translation thereof) dated May 3, 2018 issued in counterpart International Application No. PCT/JP2015/08001.

Japanese Office Action (and English language translation thereof) dated Jun. 13, 2019 issued in counterpart Japanese Application No. 2017-546379.

* cited by examiner

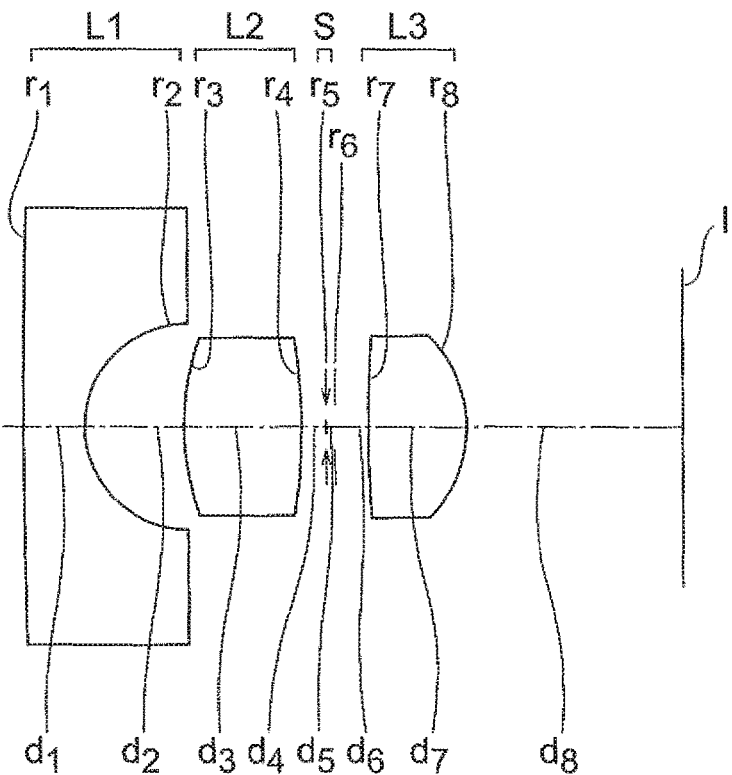
FIG. 1A
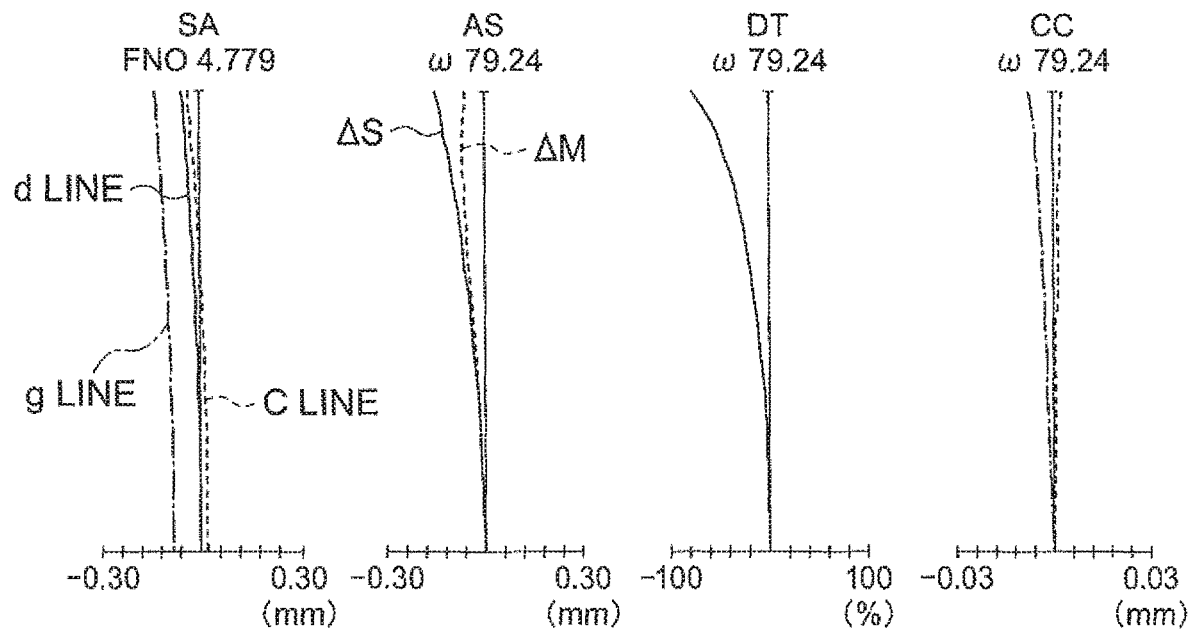

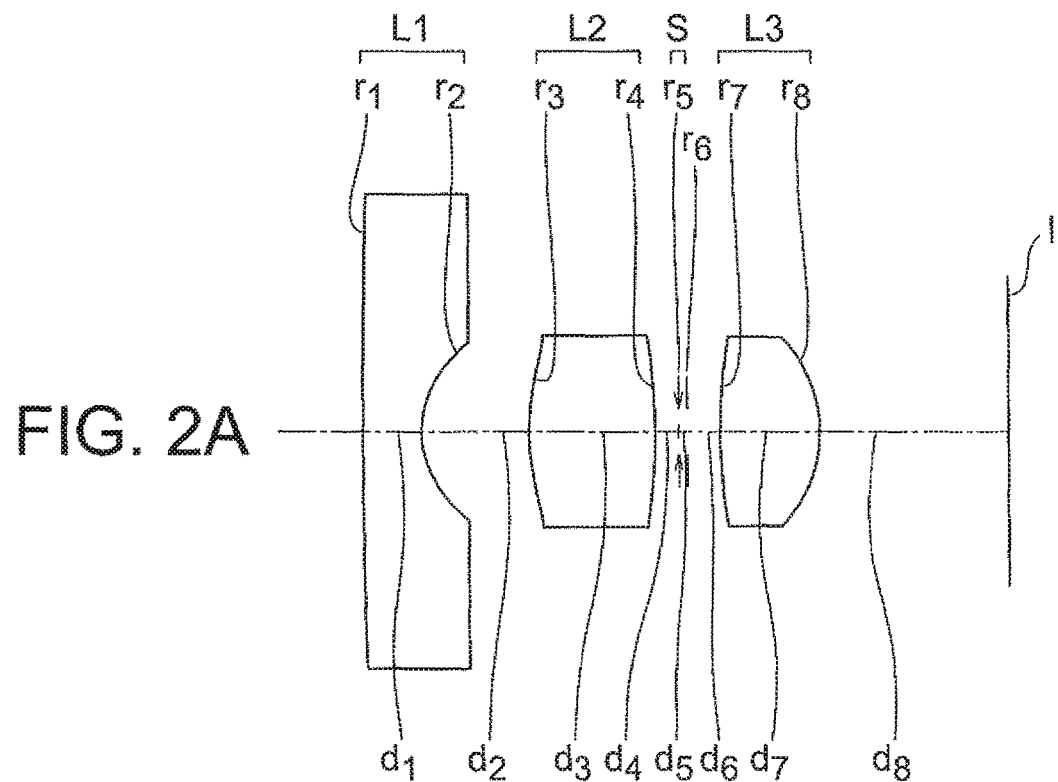
FIG. 2A
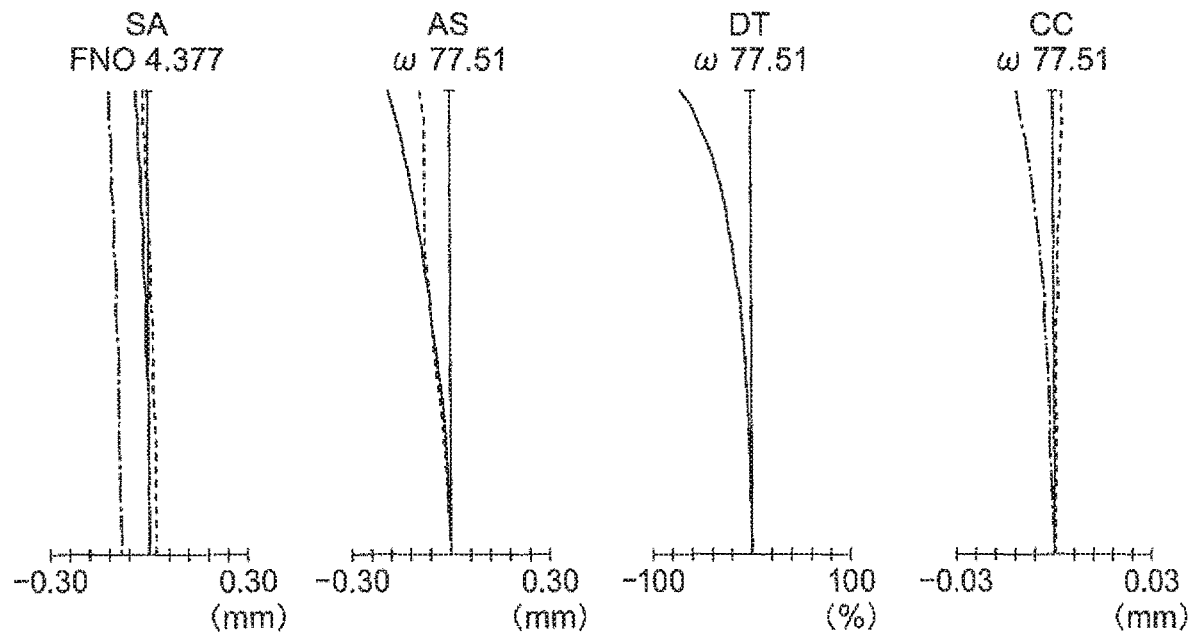
FIG. 2B
SA
FNO 4.377
FIG. 2C
AS
ω 77.51
FIG. 2D
DT
ω 77.51
FIG. 2E
CC
ω 77.51

SA
FNO 4.276

AS
ω 77.63

DT
ω 77.63

CC
ω 77.63

SA
FNO 4.165

AS
ω 76.17

DT
ω 76.17

CC
ω 76.17

SA
FNO 3.246

AS
ω 77.29

DT
ω 77.29

CC
ω 77.29

SA
FNO 4.103

AS
ω 76.98

DT
ω 76.98

CC
ω 76.98

SA
FNO 2.736

AS
ω 76.82

DT
ω 76.82

CC
ω 76.82

SA  AS  DT  CC
FNO 4.378  ω 67.18  ω 67.18  ω 67.18

SA
FNO 3.369

AS
ω 78.70

DT
ω 78.70

CC
ω 78.70

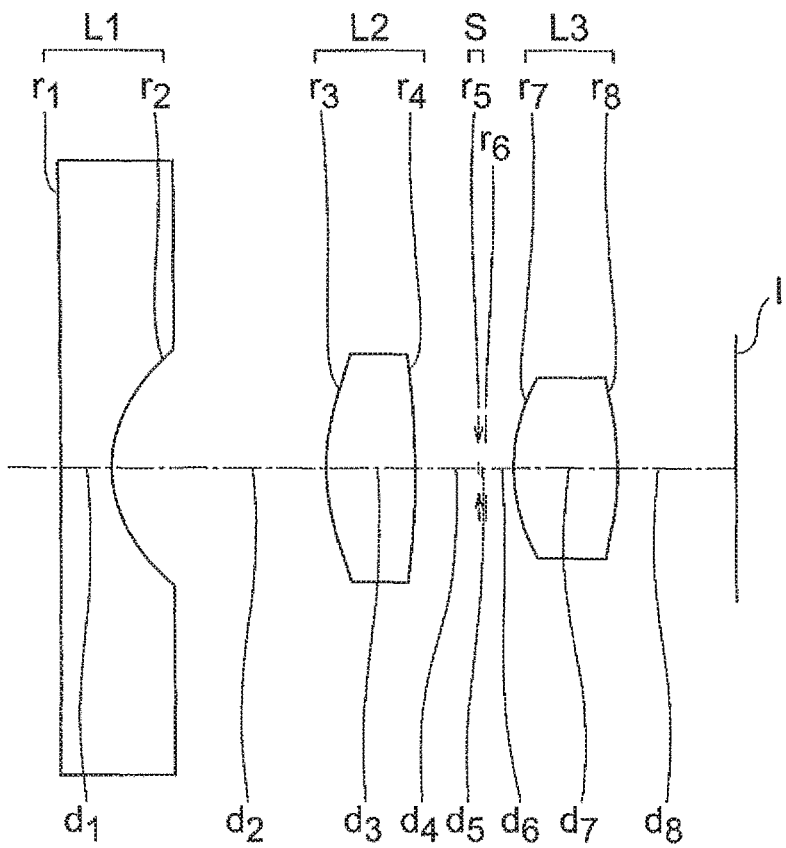
FIG.11A
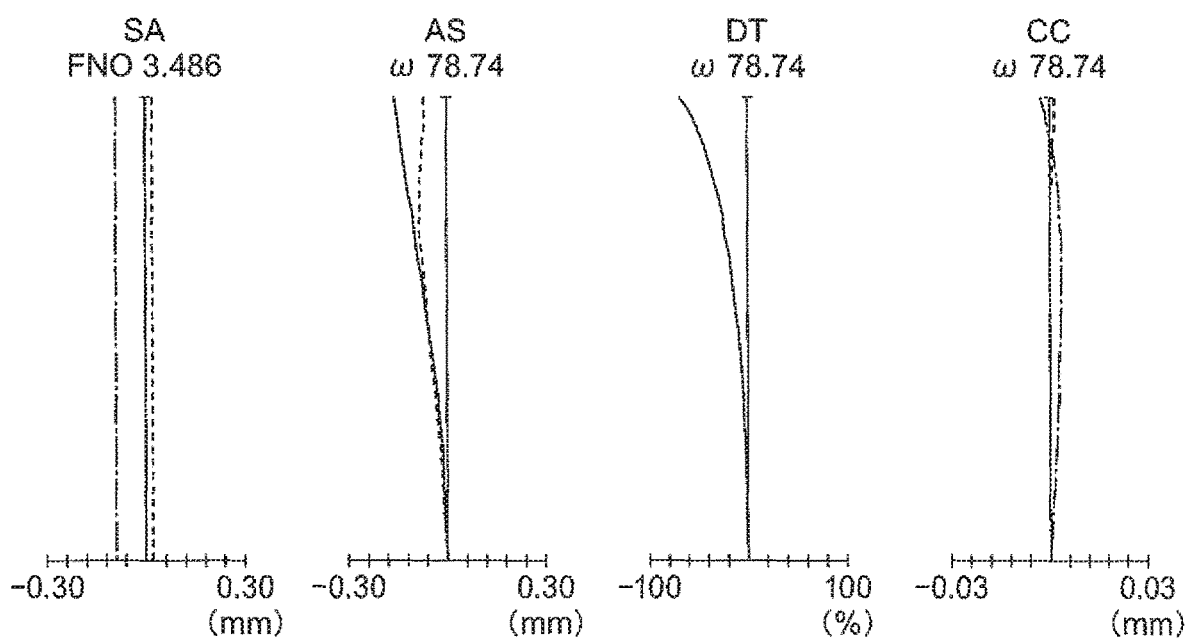
FIG. 11B
SA
FNO 3.486
-0.30  0.30
(mm)
FIG. 11C
AS
ω 78.74
-0.30  0.30
(mm)
FIG. 11D
DT
ω 78.74
-100  100
(%)
FIG. 11E
CC
ω 78.74
-0.03  0.03
(mm)

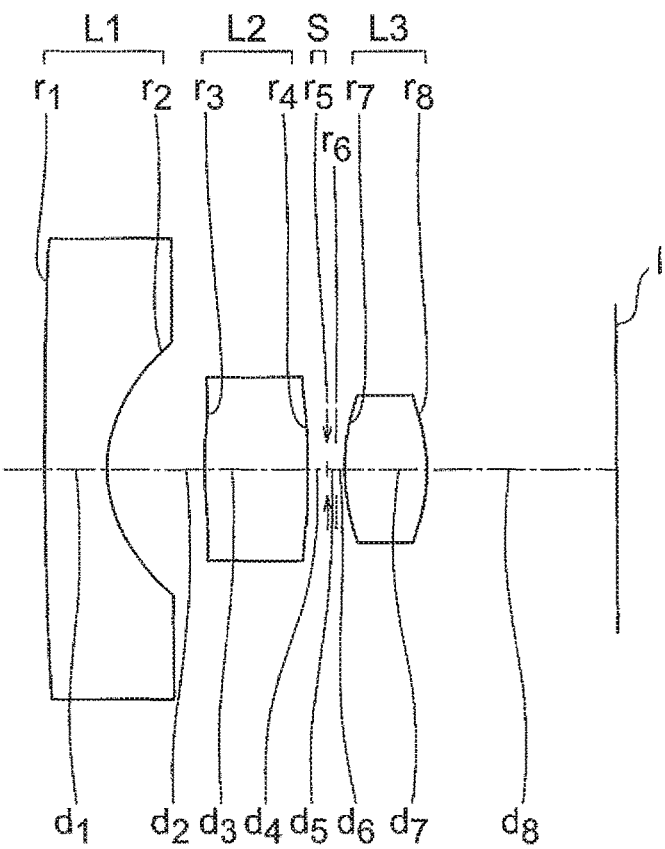
FIG.12A
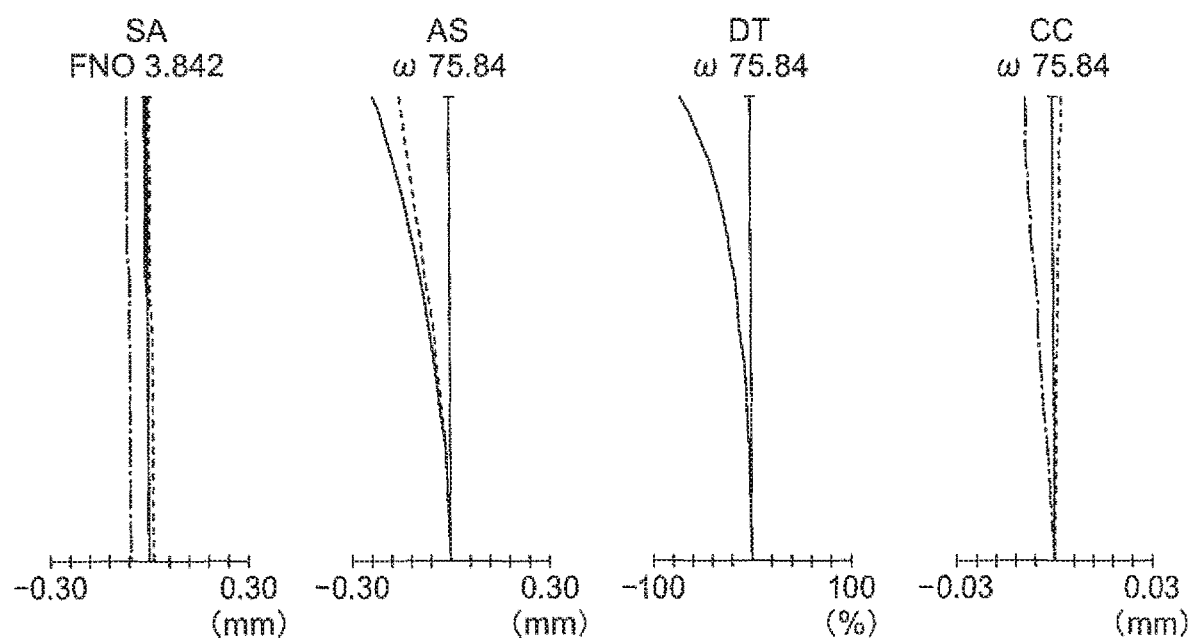
FIG. 12B
SA
FNO 3.842
FIG. 12C
AS
ω 75.84
FIG. 12D
DT
ω 75.84
FIG. 12E
CC
ω 75.84

IMAGE PICKUP APPARATUS AND OPTICAL APPARATUS USING THE SAME

CROSS-REFERENCE TO RELATED APPLICATION

The present application is a continuation application of International Application No. PCT/JP2015/080001 filed on Oct. 23, 2015, the entire contents of which are incorporated herein by reference.

BACKGROUND OF THE INVENTION

Field of the Invention

The present invention relates to an image pickup apparatus and an optical apparatus using the same.

Description of the Related Art

In optical apparatuses such as endoscopes and digital cameras, it is desired that a wide range can be captured. For this, in an objective optical system of these optical apparatuses, it is desired that an angle of view is wide.

Endoscopes include an endoscope having a scope unit (hereinafter, referred to as 'scope type endoscope') and a capsule endoscope. In an objective optical system of a scope type endoscope and an objective optical system of a capsule endoscope (hereinafter, referred to as 'objective optical system of endoscope'), widening of the angle of view is desired. The angle of view desired in the objective optical system of endoscope is generally 130 degrees or more.

Moreover, in the scope type endoscope and the capsule endoscope, reducing stress on a patient as much as possible, and improving an operability of an operator have been desired. For this, in the scope type endoscope, shortening a length of a rigid tip portion is desired and in the capsule endoscope, shortening an overall length is desired. Therefore, in the objective optical system of endoscope, a length in an optical axial direction is sought to be shortened. For such reasons, with regard to the objective optical system of endoscope, it is significant to make an overall length of the optical system as short as possible.

Whereas, in the objective optical system of the above-mentioned optical apparatus, a cost reduction is desired. Reducing the number of lenses in the objective optical system is an example of a means of reducing the cost. Various technologies for reducing the number of lenses have been proposed heretofore.

However, when there is an excessive reduction of the number of lenses, sometimes, an aberration correction becomes inadequate. Therefore, when an attempt is made to carry out sufficient aberration correction with less number of lenses, it becomes difficult to realize widening of the angle of view.

For such reasons, particularly, in the objective optical system of endoscope, achieving both of the adequate aberration correction and widening of angle of view, has become a technological issue. Moreover, with regard to the objective optical system of endoscope, it is significant not only to reduce simply the number of lenses but also to make the overall length of the optical system as short as possible as mentioned above.

For reducing the cost, it is preferable not only to reduce the number of lenses but also to use an inexpensive material for lenses. Glass and resins have been known as a material of lenses. Out of these materials, resins are comparatively inexpensive. For such reason, it is preferable to use a resin as a material of lens.

However, for resins, the lower the price, smaller is a refractive index in many cases. The smaller the refractive index of a lens, more difficult it is to widen the angle of view and to make the size small. For such reasons, even when a resin having a comparatively small refractive index is used, it is necessary to devise an idea to enable widening of the angle of view and small-sizing.

An imaging lens which includes a small number of lenses has been disclosed in Japanese Patent No. 4815319 Publication. The imaging lens disclosed in Japanese Patent No. 4815319 Publication includes in order from an object side, a first lens having a negative refractive power, a second lens, an aperture stop, and a third lens having a positive refractive power.

The first lens has a meniscus shape of which a convex surface is directed toward the object side. In the second lens, at least one surface is an aspheric surface. In the third lens, a surface on an image side is a convex surface, and at least one surface is an aspheric surface.

In this imaging lens, from a point of view of facilitating small-sizing of an optical system, the number of lenses is three. Moreover, from a point of view of cost-reduction, a resin is used for a material of lenses.

SUMMARY OF THE INVENTION

An image pickup apparatus of the present invention comprises:
an optical system which includes a plurality of lenses, and
an image sensor which is disposed at an image position of the optical system, wherein
the optical system includes in order from an object side,
a first lens having a negative refractive power,
a second lens having a positive refractive power,
an aperture stop, and
a third lens, and
each of the first lens, the second lens, and the third lens is formed of a material having a refractive index not higher than 1.70, and
the following conditional expressions (1) and (2) are satisfied:

$$2.0 < \Sigma d/FL < 5.5 \quad (1), \text{ and}$$

$$0.5 < \Phi 1L/IH < 3.0 \quad (2)$$

where,
$\Sigma d$ denotes a distance from an object-side surface of the first lens up to a lens surface positioned nearest to image,
FL denotes a focal length of the overall optical system,
IH denotes a maximum image height, and
$\Phi 1L$ denotes an effective aperture at the object-side surface of the first lens.

Moreover, an optical apparatus of the present invention comprises;
an image pickup apparatus, and
a signal processing circuit.

BRIEF DESCRIPTION OF THE DRAWINGS

FIG. 1A, and FIG. 1B, FIG. 1C, FIG. 1D, and FIG. 1E are a cross-sectional view and aberration diagrams of an optical system of an example 1;

FIG. 2A, and FIG. 2B, FIG. 2C, FIG. 2D, and FIG. 2E are a cross-sectional view and aberration diagrams of an optical system of an example 2;

FIG. 11A, and FIG. 11B, FIG. 11C, FIG. 11D, and FIG. 11E are a cross-sectional view and aberration diagrams of an optical system of an example 11;

FIG. 12A, and FIG. 12B, FIG. 12C, FIG. 12D, and FIG. 12E are a cross-sectional view and aberration diagrams of an optical system of an example 12;

DETAILED DESCRIPTION OF THE INVENTION

Figure 3A:
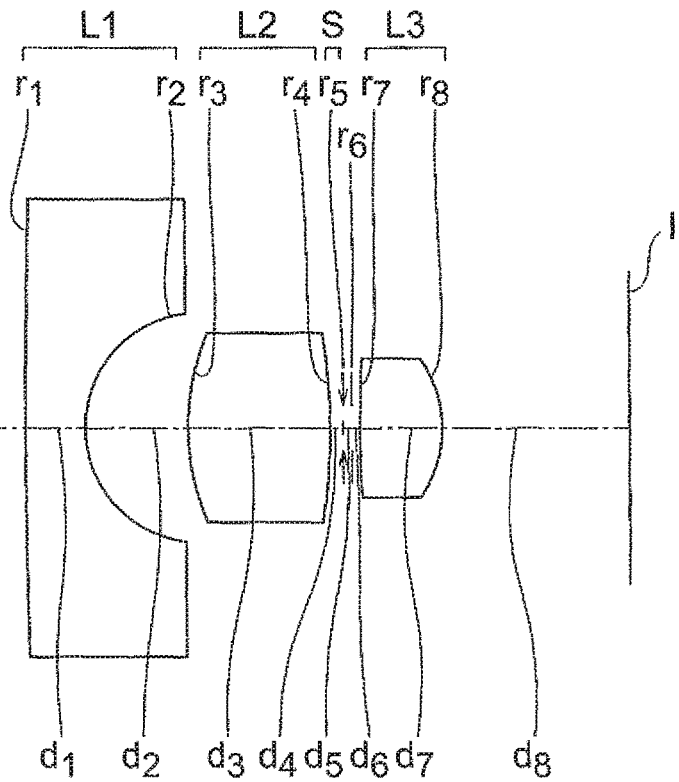
FIG. 3A, and FIG. 3B, FIG. 3C, FIG. 3D, and FIG. 3E are a cross-sectional view and aberration diagrams of an optical system of an example 3.
Figure 3B:
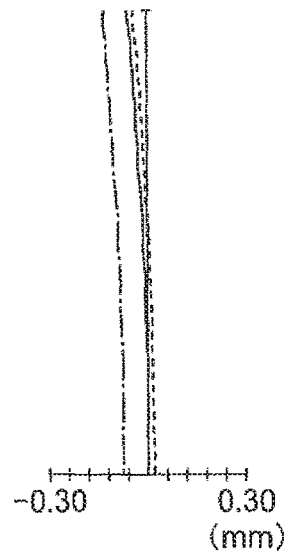
Figure 3C:
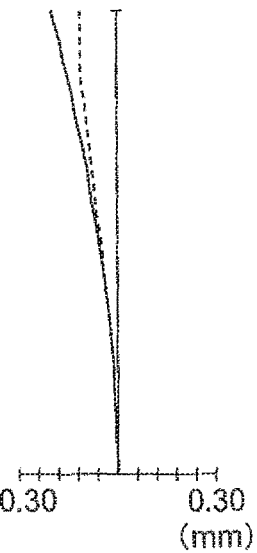
Figure 3D:
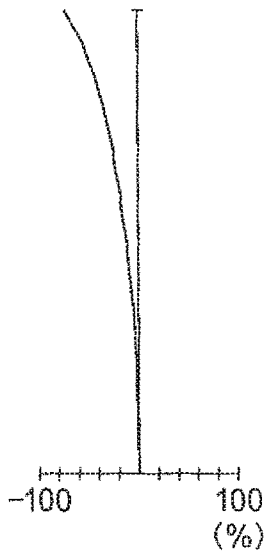
Figure 3E:
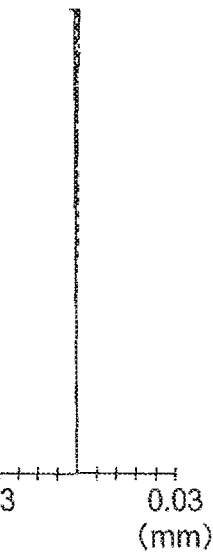
Figures 4A, 4B, 4C, 4D, 4E:
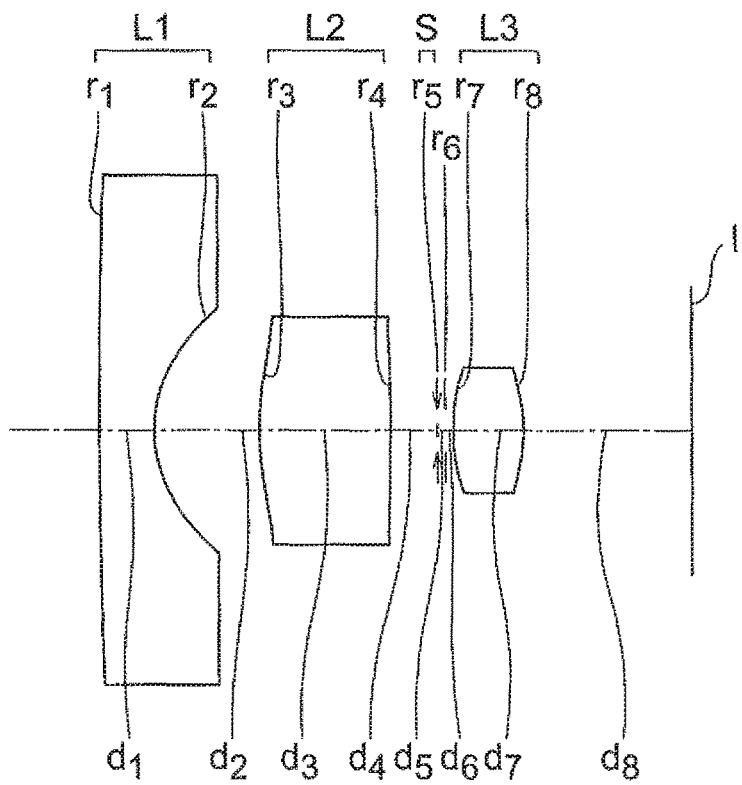
FIG. 4A, and FIG. 4B, FIG. 4C, FIG. 4D, and FIG. 4E are a cross-sectional view and aberration diagrams of an optical system of an example 4.
Figure 5A:
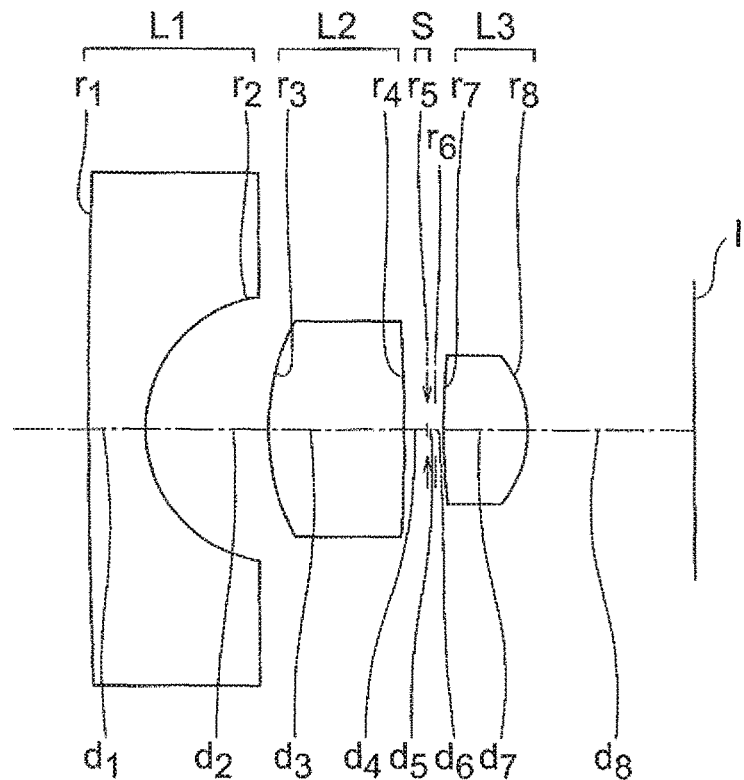
FIG. 5A, and FIG. 5B, FIG. 5C, FIG. 5D, and FIG. 5E are a cross-sectional view and aberration diagrams of an optical system of an example 5.
Figure 5B:
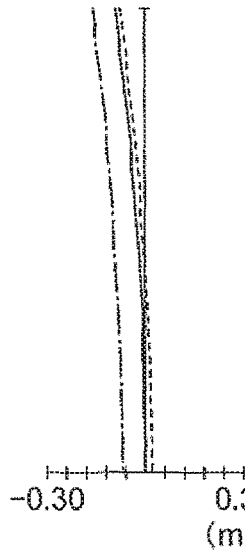
Figure 5C:
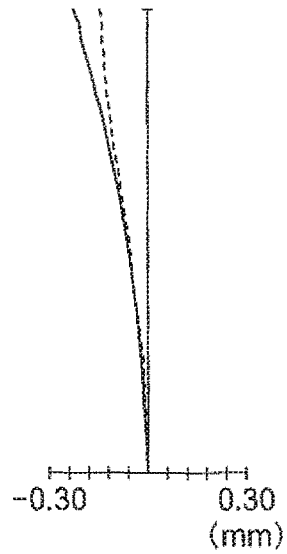
Figure 5D:
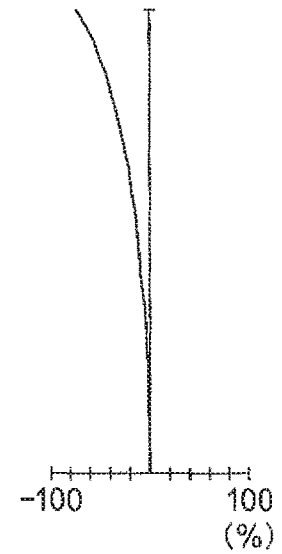
Figure 5E:
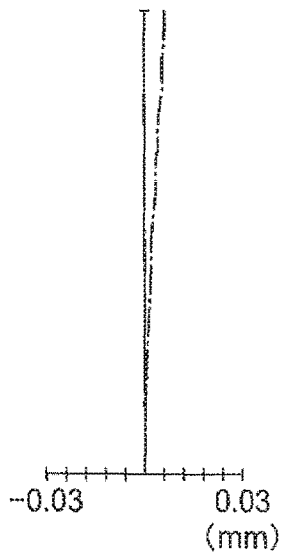
Figures 6A, 6B, 6C, 6D, 6E:
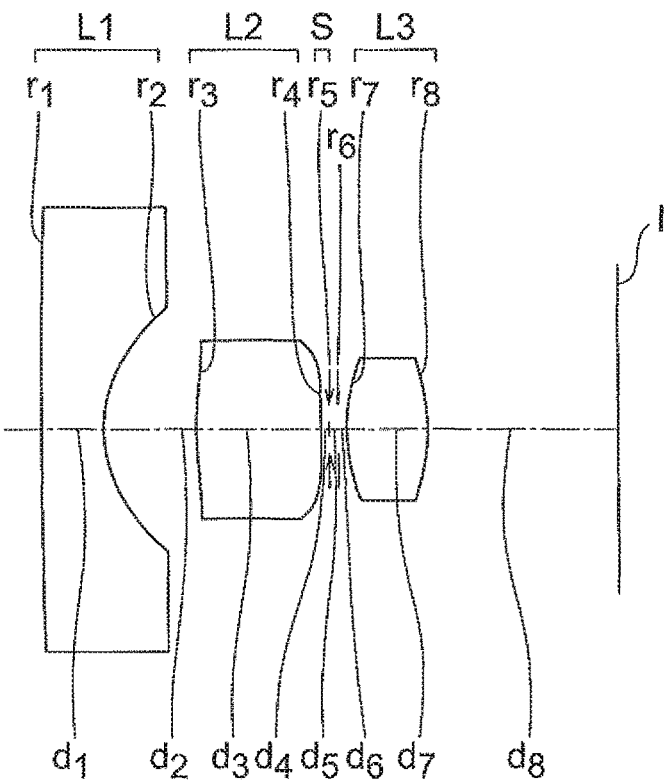
FIG. 6A, and FIG. 6B, FIG. 6C, FIG. 6D, and FIG. 6E are a cross-sectional view and aberration diagrams of an optical system of an example 6.
Figure 7A:
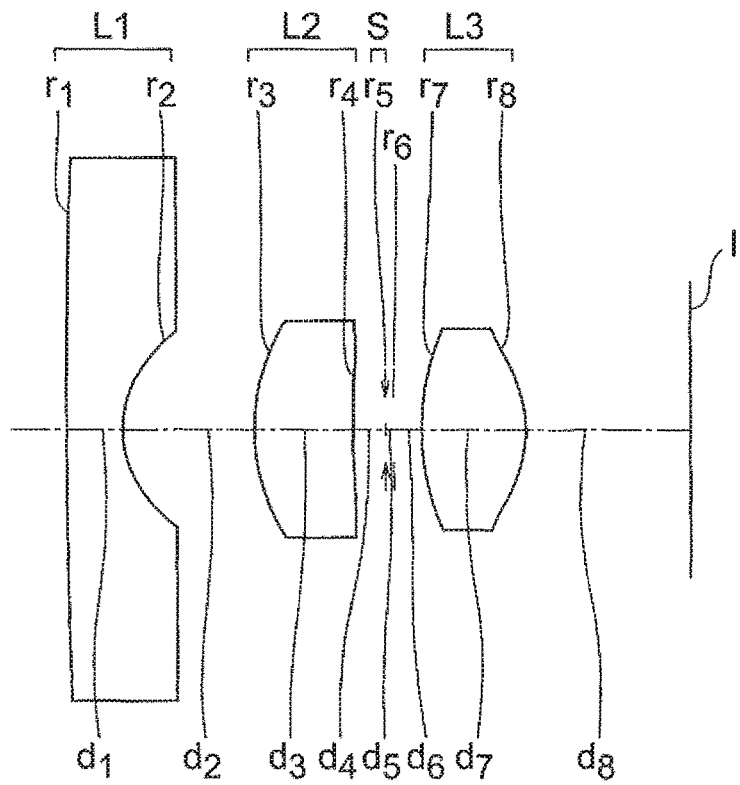
FIG. 7A, and FIG. 7B, FIG. 7C, FIG. 7D, and FIG. 7E are a cross-sectional view and aberration diagrams of an optical system of an example 7.
Figure 7B:
Figure 7C:
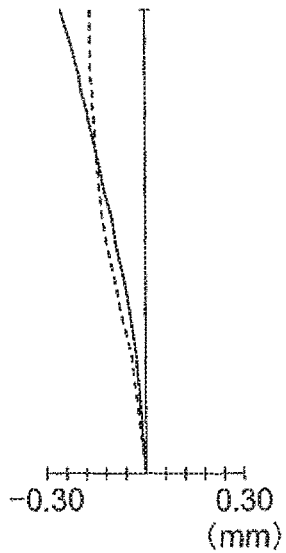
Figure 7D:
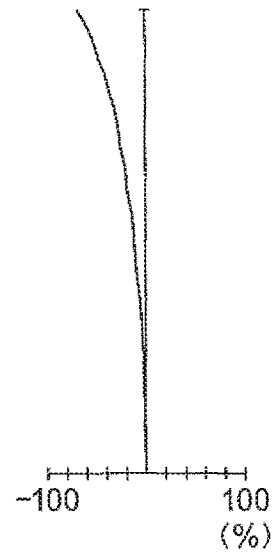
Figure 7E:
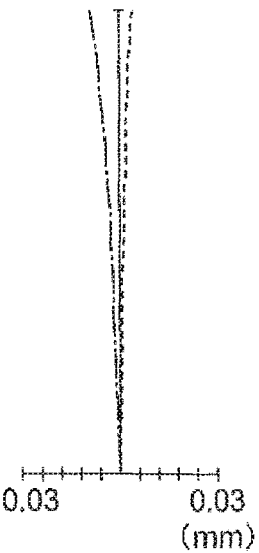
Figure 8A:
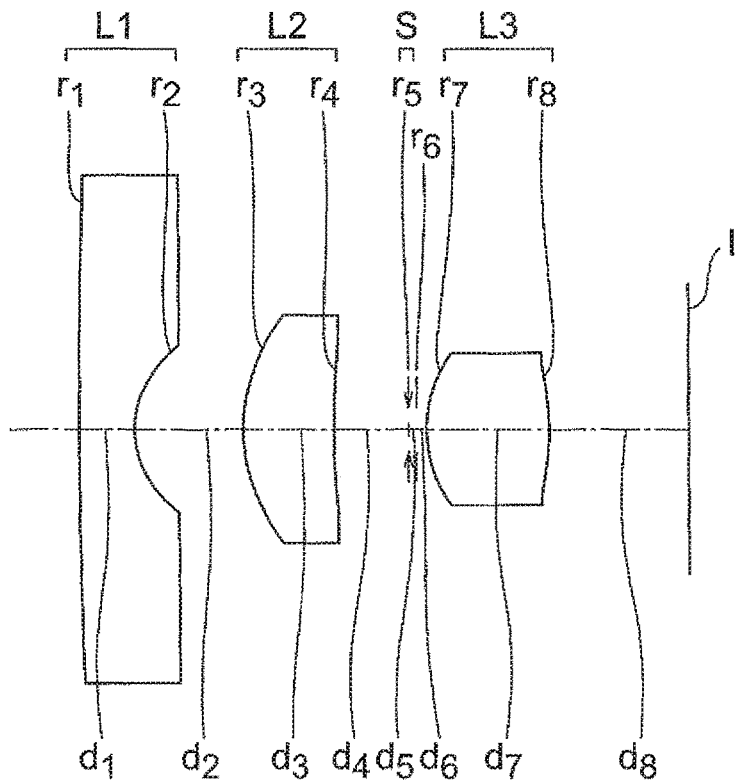
FIG. 8A, and FIG. 8B, FIG. 8C, FIG. 8D, and FIG. 8E are a cross-sectional view and aberration diagrams of an optical system of an example 8.
Figures 8B, 8C, 8D, 8E:
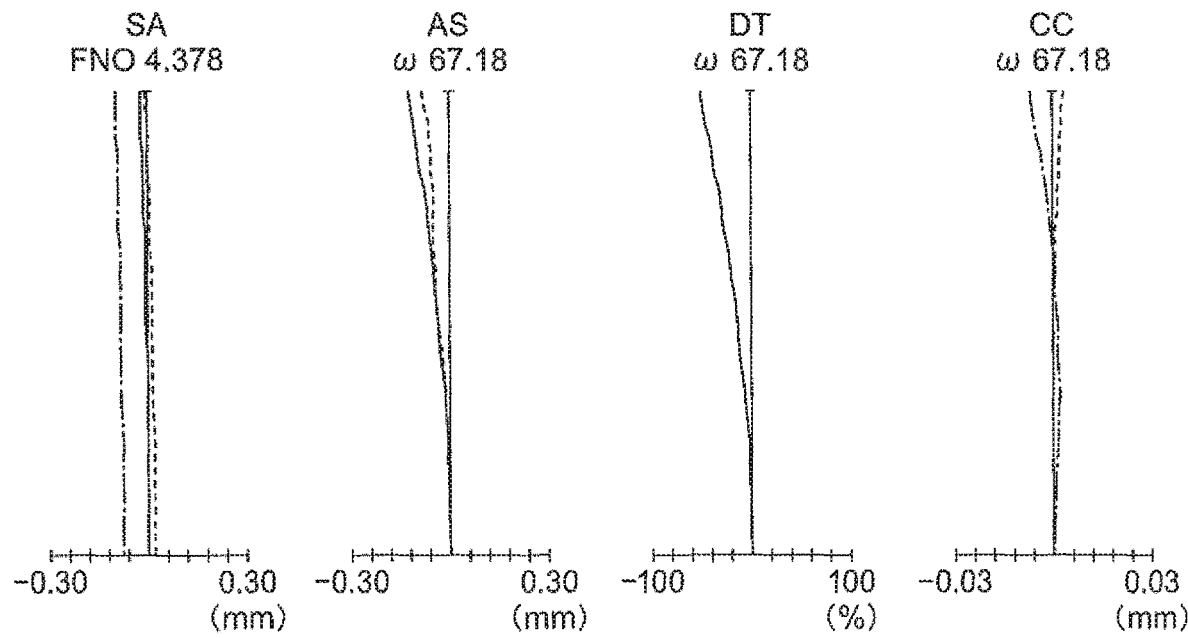
Figure 9A:
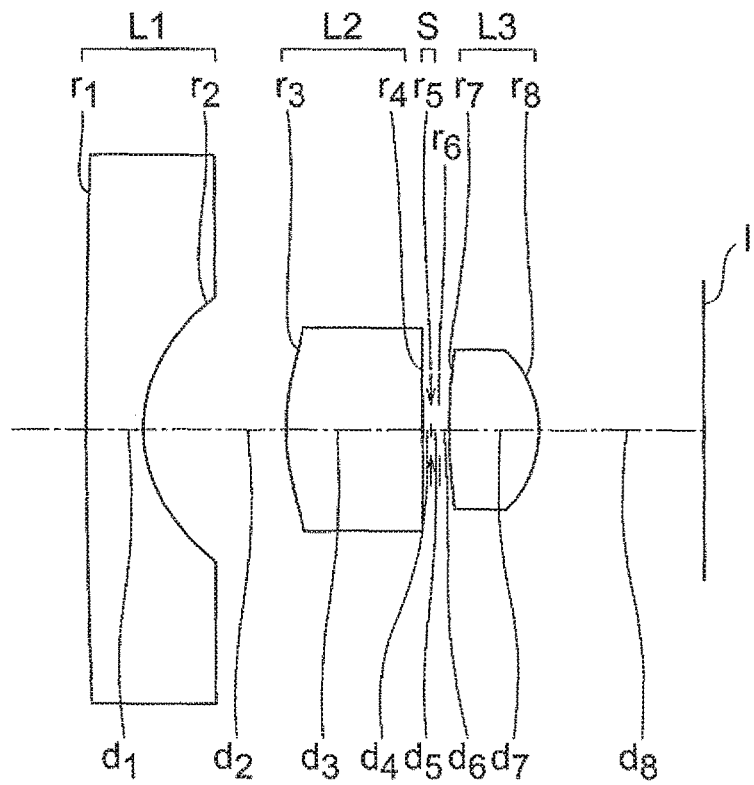
FIG. 9A, and FIG. 9B, FIG. 9C, FIG. 9D, and FIG. 9E are a cross-sectional view and aberration diagrams of an optical system of an example 9.
Figure 9B:
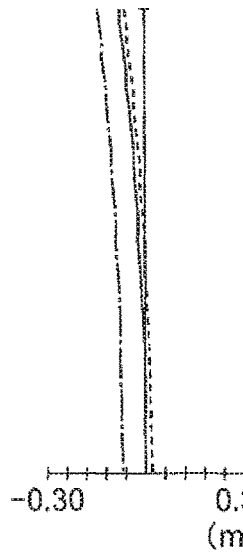
Figure 9C:
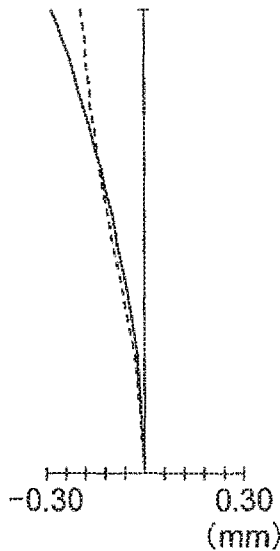
Figure 9D:
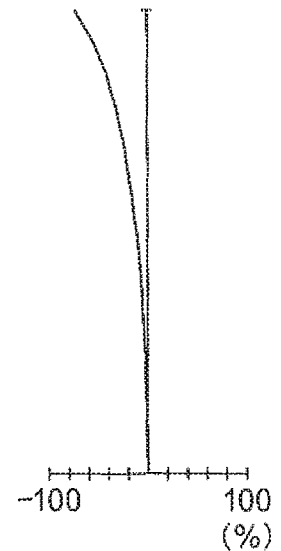
Figure 9E:
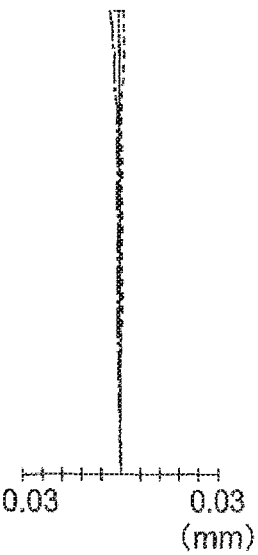
Figure 10A:
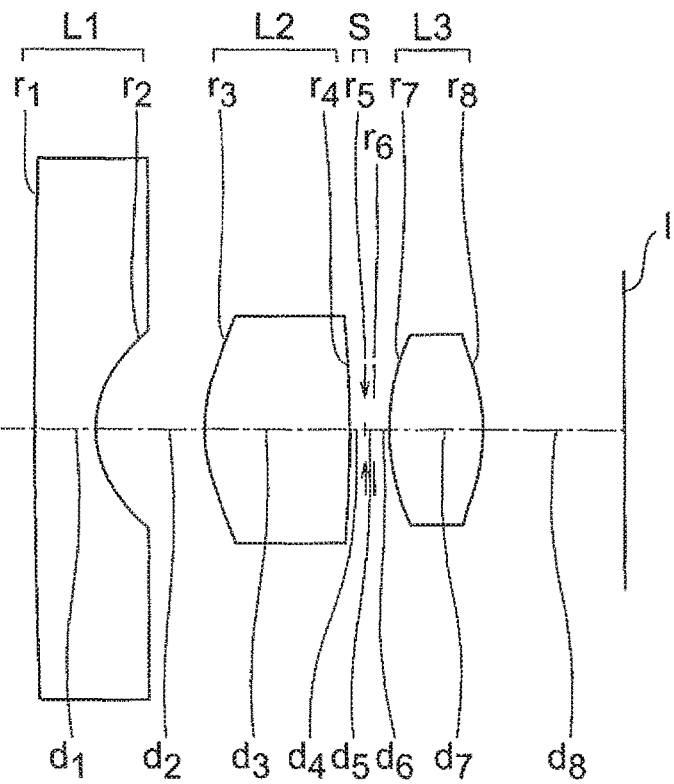
FIG. 10A, and FIG. 10B, FIG. 10C, FIG. 10D, and FIG. 10E are a cross-sectional view and aberration diagrams of an optical system of an example 10.
Figures 10B, 10C, 10D, 10E:
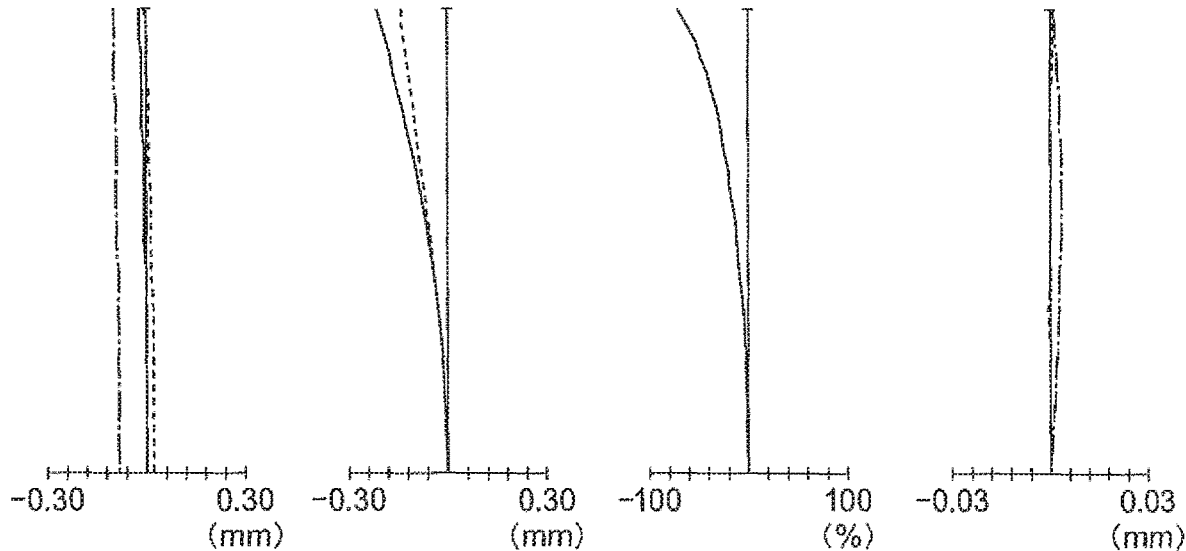

Prior to the explanation of examples, action and effect of embodiments according to certain aspects of the present invention will be described below. In the explanation of the action and effect of the embodiments concretely, the explanation will be made by citing concrete examples. However, similar to a case of the examples to be described later, aspects exemplified thereof are only some of the aspects included in the present invention, and there exists a large number of variations in these aspects. Consequently, the present invention is not restricted to the aspects that will be exemplified.

An image pickup apparatus of the present embodiment includes an optical system which includes a plurality of lenses, and an image sensor which is disposed at an image position of the optical system, wherein the optical system includes in order from an object side, a first lens having a negative refractive power, a second lens having a positive refractive power, an aperture stop, and a third lens, and each of the first lens, the second lens, and the third lens is formed of a material having a refractive index not higher than 1.70, and the following conditional expressions (1) and (2) are satisfied:

$$2.0 < \Sigma d/FL < 5.5 \quad (1), \text{ and}$$

$$0.5 < \Phi 1L/IH < 3.0 \quad (2)$$

where, $\Sigma d$ denotes a distance from an object-side surface of the first lens up to a lens surface positioned nearest to image, FL denotes a focal length of the overall optical system, IH denotes a maximum image height, and $\Phi 1L$ denotes an effective aperture at the object-side surface of the first lens.

In the optical system of the image pickup apparatus according to the present embodiment, a lens having a negative refractive power is used for the first lens. Accordingly, it is possible to secure a wide angle of view.

In a case in which the first lens is configured by a lens having a negative refractive power, a curvature of field and a chromatic aberration occur in the first lens. Therefore, by disposing a lens having a positive refractive power on the image side of the first lens, the curvature of field and the chromatic aberration are corrected favorably.

Specifically, the second lens having a positive refractive power is disposed on the image side of the first lens. Accordingly, it is possible to correct the curvature of field and the chromatic aberration favorably.

Moreover, each of the first lens, the second lens, and the third lens is formed of a material having a refractive index not higher than 1.70. By making an arrangement such that the refractive index of the material of each lens does not exceed 1.70, it is possible to suppress a fluctuation in a focal position due to factors such as a manufacturing error of the refractive index.

Moreover, in the image pickup apparatus of the present embodiment, the abovementioned conditional expressions (1) and (2) are satisfied.

Conditional expression (1) is a conditional expression related to a ratio of the total length of the optical system and the focal length of the overall optical system. By satisfying conditional expression (1), it is possible to achieve small-sizing and widening of the angle of view of the optical system.

By exceeding a lower limit value of conditional expression (1), it is possible to make the focal length of the overall optical system small. As a result, it is possible to widen the angle of view of the optical system. By falling below an upper limit value of conditional expression (1), it is possible to suppress an increase in the total length of the optical system. As a result, it is possible to make the optical system small-sized.

Conditional expression (2) is a conditional expression related to a ratio of the maximum image height and the effective aperture at the first lens. By satisfying conditional expression (2), it is possible to make the optical system small-sized.

By exceeding a lower limit value of conditional expression (2), it is possible to suppress the maximum image height to be small. Therefore, a size of the image sensor does not become excessively large. As a result, it is possible to make the image pickup apparatus small-sized. By falling below an upper limit value of conditional expression (2), it is possible to suppress a diameter of the first lens to be small. As a result, it is possible to make the optical system small-sized.

It is preferable that the following conditional expression (1') be satisfied instead of conditional expression (1).

$$2.2 < \Sigma d/FL < 5.5 \quad (1')$$

It is more preferable that the following conditional expression (1") be satisfied instead of conditional expression (1).

$$2.5 < \Sigma d/FL < 5.25 \quad (1")$$

It is more preferable that the following conditional expression (2') be satisfied instead of conditional expression (2).

$$0.8 < \Phi 1L/IH < 2.8 \quad (2')$$

It is even more preferable that the following conditional expression (2") be satisfied instead of conditional expression (2).

$$1.0 < \Phi 1L/IH < 2.5 \quad (2'')$$

In such manner, the optical system of the image pickup apparatus according to the present embodiment, while being small-sized, has a wide angle of view, and in which various aberrations are corrected favorably. Consequently, according to the optical system of the image pickup apparatus of the present embodiment, a wide-angle optical image having a high resolution is achieved. Moreover, according to the image pickup apparatus of the present embodiment, it is possible to realize an image pickup apparatus equipped with an optical system which has a wide angle of view, and in which various aberrations are corrected favorably, while being small-sized.

In the image pickup apparatus of the present embodiment, it is preferable that a surface nearest to the object side of the third lens be a convex surface directed toward the object side.

For widening an angle of view, it is preferable to make the negative refractive power of the first lens large. However, when the negative refractive power of the first lens is made large, an amount of various aberrations that occur becomes large. In this case, it is preferable to make the refractive power of the third lens the positive refractive power, and to correct various aberrations enhanced in the first lens favorably with the second lens.

At this time, by letting the surface nearest to object of the third lens to be a convex surface directed toward the object side, it is possible to make large the positive refractive power of the third lens easily. As a result, it is possible to correct favorably various aberrations enhanced in the first lens, even when the negative refractive power of the first lens is made large.

In the image pickup apparatus of the present embodiment, it is preferable that the half angle of view be not less than 65 degrees.

By making such arrangement, it is possible to capture a wide range.

In the image pickup apparatus of the present embodiment, it is preferable that the following conditional expression (3) be satisfied:

$$0.7 < f2/f3 < 5 \quad (3),$$

where, f2 denotes a focal length of the second lens, and
f3 denotes a focal length of the third lens.

Conditional expression (3) is a conditional expression related to a ratio of the focal length of the second lens and the focal length of the third lens. By satisfying conditional expression (3), it is possible to make the optical system small-sized, as well as to correct the chromatic aberration and a coma favorably.

By exceeding a lower limit value of conditional expression (3), it is possible to let the refractive power of the third lens to be of an appropriate magnitude. As a result, it is possible to correct an off-axis coma favorably. By falling below an upper limit value of conditional expression (3), it is possible to make the refractive power of the second lens unit large. As a result, it is possible to shorten the total length of the optical system, as well as to correct favorably the chromatic aberration that occurs in the first lens. Moreover, it is possible to correct both the chromatic aberration of magnification and the longitudinal chromatic aberration favorably.

It is more preferable that the following conditional expression (3') be satisfied instead of conditional expression (3).

$$0.8 < f2/f3 < 4 \quad (3')$$

It is even more preferable that the following conditional expression (3") be satisfied instead of conditional expression (3).

$$0.9 < f2/f3 < 4.5 \quad (3'')$$

In the image pickup apparatus of the present embodiment, it is preferable that in an orthogonal coordinate system in which a horizontal axis is let to be vd2 and a vertical axis is let to be θgF2, when a straight line expressed by θgF2=αp× vd2+β, where, αp=−0.005 is set, vd2 and θgF2 of the second lens be included in both of an area determined by the straight line in which a value of β is a lower limit value of a range of the following conditional expression (4) and the straight line in which a value of β is an upper limit value of the range of the following conditional expression (4), and an area determined by the following conditional expression (5):

$$0.750 < \beta < 0.775 \quad (4), \text{ and}$$

$$12 < vd2 < 30 \quad (5),$$

where,

θgF2 denotes a partial dispersion ratio (ng2−nF2)/(nF2−nC2) of the second lens, and vd2 denotes Abbe number (nd−1)/(nF−nC) for the second lens, and here nd, nC2, nF2, and ng2 are refractive indices of the second lens for a d-line, a C-line, an F-line, and a g-line respectively.

By making such arrangement, it is possible to carry out achromatism for the F-line and the C-line. Furthermore, it is possible to correct adequately even the secondary spectrum. The second spectrum is a chromatic aberration for the g-line when the achromatism has been carried out for the F-line and the C-line.

In the image pickup apparatus of the present embodiment, it is preferable that the following conditional expression (6) be satisfied:

$$-1.5 < (R3L+R3R)/(R3L-R3R) < 2 \quad (6),$$

where,

R3L denotes a paraxial radius of curvature of an object-side surface of the third lens, and R3R denotes a paraxial radius of curvature of an image-side surface of the third lens.

Conditional expression (6) is a conditional expression related to a shape of the third lens.

By exceeding a lower limit value of conditional expression (6), it is possible to correct the spherical aberration favorably. As a result, it is possible to maintain a favorable optical performance. By falling below an upper limit value of conditional expression (6), it is possible to correct the astigmatism favorably. As a result, it is possible to maintain a favorable optical performance.

It is more preferable that the following conditional expression (6') be satisfied instead of conditional expression (6).

$$-1.2 < (R3L+R3R)/(R3L-R3R) < 1.8 \quad (6')$$

It is even more preferable that the following conditional expression (6") be satisfied instead of conditional expression (6).

$$-0.8<(R3L+R3R)/(R3L-R3R)<1.5 \quad (6")$$

In the image pickup apparatus of the present embodiment, it is preferable that the following conditional expression (7) be satisfied:

$$-4.0<f1/FL<-1.0 \quad (7),$$

where, f1 denotes a focal length of the first lens, and

FL denotes the focal length of the overall optical system.

Conditional expression (7) is a conditional expression related to a ratio of the focal length of the first lens and the focal length of the overall optical system. By satisfying conditional expression (7), it is possible to make the optical system small-sized, and to correct the chromatic aberration favorably.

By exceeding a lower limit value of conditional expression (7), it is possible to correct a chromatic aberration of magnification favorably. By falling below an upper limit value of conditional expression (7), it is possible to correct a longitudinal chromatic aberration favorably. Moreover, since it is possible to position a principal point of the overall optical system on the object side, it is possible to make the optical system small-sized.

It is more preferable that the following conditional expression (7') be satisfied instead of conditional expression (7).

$$-3.5<f1/FL<-1.1 \quad (7')$$

It is even more preferable that the following conditional expression (7") be satisfied instead of conditional expression (7).

$$-2.8<f1/FL<-1.2 \quad (7")$$

In the image pickup apparatus of the present embodiment, it is preferable that the following conditional expression (8) is satisfied:

$$0.8<(R1L+R1R)/(R1L-R1R)<1.2 \quad (8),$$

where,

R1L denotes the paraxial radius of curvature of the object-side surface of the first lens, and R1R denotes a paraxial radius of curvature of an image-side surface of the first lens.

Conditional expression (8) is a conditional expression related to a shape of the first lens.

By exceeding a lower limit value of conditional expression (8), it is possible to correct the astigmatism favorably. As a result, it is possible to maintain a favorable optical performance. By falling below an upper limit value of conditional expression (8), it is possible to correct the spherical aberration favorably. As a result, it is possible to maintain a favorable optical performance.

It is more preferable that the following conditional expression (8') be satisfied instead of conditional expression (8).

$$0.9<(R1L+R1R)/(R1L-R1R)<1.15 \quad (8')$$

It is even more preferable that the following conditional expression (8") be satisfied instead of conditional expression (8).

$$0.9<(R1L+R1R)/(R1L-R1R)<1.1 \quad (8")$$

In the image pickup apparatus of the present embodiment, it is preferable that the following conditional expression (9) be satisfied:

$$1.5<D1Ls/FL<5 \quad (9),$$

where,

D1Ls denotes a distance from the object-side surface of the first lens up to the apertures stop, and FL denotes the focal length of the overall optical system.

In a case in which a thickness of the aperture stop is thin, D1Ls becomes a distance from the object-side surface of the first lens up to an object-side surface of the aperture stop, or a distance from the object-side surface of the first lens up to an image-side surface of the aperture stop. In a case in which the aperture stop is somewhat thick, D1Ls becomes a distance from the object-side surface of the first lens up to the object-side surface of the aperture stop.

By exceeding a lower limit value of conditional expression (9), it is possible to move away the aperture stop from the object-side surface of the first lens. Accordingly, at the first lens, it is possible to separate a position through which an axial light beam passes and a position through which an off-axis light beam passes. As a result, it is possible to correct both of an axial aberration and an off-axis aberration favorably. By falling below an upper limit value of conditional expression (9), it is possible to suppress a distance from the first lens up to the aperture stop, to be short. As a result, it is possible to shorten the total length of the optical system.

It is more preferable that the following conditional expression (9') be satisfied instead of conditional expression (9).

$$1.8<D1Ls/FL<4.8 \quad (9')$$

It is even more preferable that the following conditional expression (9") be satisfied instead of conditional expression (9).

$$1.8<D1Ls/FL<4.5 \quad (9")$$

In the image pickup apparatus of the present embodiment, it is preferable that the following conditional expression (10) be satisfied:

$$-0.1<f1/R1L<0.1 \quad (10),$$

where,

R1L denotes a paraxial radius of curvature of an object-side surface of the first lens, and f1 denotes the focal length of the first lens.

By exceeding a lower limit value of conditional expression (10), it is possible to suppress an aberration that occurs in a peripheral portion of an image, to be small. As a result, it is possible to correct favorably, an astigmatism in particular. By falling below an upper limit value of conditional expression (10), it is possible to suppress an aberration that occurs at a central portion of the image. As a result, it is possible to correct favorably, the spherical aberration in particular.

It is more preferable that the following conditional expression (10') be satisfied instead of conditional expression (10).

$$-0.09<f1/R1L<0.09 \quad (10')$$

It is even more preferable that the following conditional expression (10") be satisfied instead of conditional expression (10).

$$-0.08<f1/R1L<0.08 \quad (10")$$

In the image pickup apparatus of the present embodiment, it is preferable that the following conditional expression (11) be satisfied:

$$\alpha max - \alpha min < 4.0 \times 10^{-5}/°\text{ C.} \qquad (11),$$

where,

α max denotes a largest coefficient of linear expansion among coefficients of linear expansion at 20 degrees of the plurality of lenses, and α min denotes a smallest coefficient of linear expansion among the coefficients of linear expansion at 20 degrees of the plurality of lenses.

Conditional expression (11) is an expression in which a difference in the coefficient of linear expansion of the two lenses is taken. The coefficient of linear expansion is a coefficient of linear expansion at 20 degrees. The optical system of the present embodiment includes the plurality of lenses. In each of the plurality of lenses, a shape and a refractive index of lens varies with a change in temperature. Therefore, a focal length changes in each lens with the change in temperature.

Therefore, by satisfying conditional expression (11), it is possible to keep the focal length substantially constant as the overall optical system even when the focal length changes in each lens with the change in temperature. As a result, it is possible to suppress a fluctuation in aberration, and particularly a fluctuation in a spherical aberration and a fluctuation in a curvature of field. Moreover, it is possible to make a fluctuation in a focal position small.

In the image pickup apparatus of the present embodiment, it is preferable that the following conditional expression (12) be satisfied:

$$0.85 < nd1/nd2 < 1 \qquad (12),$$

where, nd1 denotes a refractive index for the d-line of the first lens, and nd2 denotes a refractive index for the d-line of the second lens.

Conditional expression (12) is a conditional expression related to a ratio of the refractive index of the first lens and the refractive index of the second lens. The conditional expression (14) is a conditional expression for small-sizing the optical system as well as for correcting the curvature of field favorably.

By exceeding a lower limit value of conditional expression (12), it is possible to make the refractive power of the positive lens large. As a result, it is possible to shorten an overall length of the optical system. By falling below an upper limit value of conditional expression (12), it is possible to make the refractive power of the negative lens small. In this case, it is possible to correct Petzval sum favorably. Therefore, exceeding the lower limit value of conditional expression (12) is advantageous for correction of Petzval sum. Moreover, it is possible correct a curvature of field favorably.

In the image pickup apparatus of the present embodiment, it is preferable that the following conditional expression (13) be satisfied:

$$15.0 < vd1 - vd2 < 40.0 \qquad (13),$$

where, vd1 denotes Abbe number for the first lens, and vd2 denotes Abbe number for the second lens.

Conditional expression (13) is a conditional expression related to a difference in Abbe number for the first lens and Abbe number for the second lens. By satisfying conditional expression (13), it is possible to correct a chromatic aberration favorably.

By exceeding a lower limit value of conditional expression (13), it is possible to correct a longitudinal chromatic aberration favorably. By falling below an upper limit value of conditional expression (13), it is possible to correct a chromatic aberration of magnification favorably.

In the image pickup apparatus of the present embodiment, it is preferable that the following conditional expression (14) be satisfied:

$$2.0 < \Sigma d/D max air < 7 \qquad (14),$$

where,

Σd denotes the distance from the lens surface positioned nearest to object up to the lens surface positioned nearest to image, and Dmaxair denotes a largest air space among air spaces between the lens surface positioned nearest to object and the lens surface positioned nearest to image.

The air space is a space between the two adjacent lenses. Moreover, in a case in which the aperture stop is positioned between the two adjacent lenses, the air space is a space between the lens and the aperture stop.

By exceeding a lower limit value of conditional expression (14), it is possible to keep a thickness of a lens appropriately. As a result, it is possible to make a workability of a lens favorable. By falling below an upper limit value of conditional expression (14), it is possible to suppress the increase in the total length of the optical system. As a result, it is possible to make the optical system small-sized.

Moreover, when the distance between the first lens and the second lens corresponds to Dmaxair, the distance between the first lens and the second lens can be secured to be adequately wide. Consequently, in the first lens, it is possible to separate the position through which the axial light beam passes and the position through which the off-axis light beam passes. As a result, it is possible to correct favorably, an off-axis aberration, and particularly the curvature of field, and moreover, it is possible to prevent the distortion from increasing further.

In such manner, it is preferable to make an arrangement such that the distance between the first lens and the second lens corresponds to Dmaxair. However, an arrangement may be made such that the distance between the second lens and the third lens corresponds to Dmaxair. In this case, since it is possible to secure both of the refractive power of the second lens and the refractive power of the third lens to be appropriate, it is possible to achieve both of small-sizing and widening of the angle of view of the optical system.

It is more preferable that the following conditional expression (14') be satisfied instead of conditional expression (14).

$$2.2 < \Sigma d/D max air < 6 \qquad (14')$$

It is even more preferable that the following conditional expression (14") be satisfied instead of conditional expression (14).

$$2.3 < \Sigma d/D max air < 5.5 \qquad (14")$$

In the image pickup apparatus of the present embodiment, it is preferable that the following conditional expression (15) be satisfied:

$$0.25 < D2/FL < 2 \qquad (15),$$

where,

D2 denotes a thickness of the second lens, and

FL denotes the focal length of the overall optical system.

By exceeding a lower limit value of conditional expression (15), it is possible to make the focal length of the overall optical system small. As a result, it is possible to further widen the angle of view of the optical system. By falling below an upper limit value of conditional expression (15), it is possible to suppress the increase in the total length of the optical system. As a result, it is possible to make the optical system small-sized.

It is more preferable that the following conditional expression (15') be satisfied instead of conditional expression (15).

$$0.4 < D2/FL < 1.8 \tag{15'}$$

It is even more preferable that the following conditional expression (15") be satisfied instead of conditional expression (15).

$$0.5 < D2/FL < 1.6 \tag{15"}$$

In the image pickup apparatus of the present embodiment, it is preferable that the following conditional expression (16) be satisfied:

$$1.2 < f2/FL < 5 \tag{16}$$

where, f2 denotes the focal length of the second lens, and

FL denotes the focal length of the overall optical system.

Conditional expression (16) is a conditional expression related to a ratio of the focal length of the second lens and the focal length of the overall optical system. By satisfying conditional expression (16), it is possible to make the optical system small-sized as well as to correct the chromatic aberration favorably.

By exceeding a lower limit value of conditional expression (16), it is possible correct the chromatic aberration of magnification favorably. By falling below an upper limit value of conditional expression (16), it is possible to correct a spherical aberration favorably. Moreover, since it is possible to make the refractive power of the second lens large, it is possible to make the optical system small-sized.

It is more preferable that the following conditional expression (16') be satisfied instead of conditional expression (16).

$$1.3 < f2/FL < 4.8 \tag{16'}$$

It is even more preferable that the following conditional expression (16") be satisfied instead of conditional expression (16).

$$1.5 < f2/FL < 4.3 \tag{16"}$$

It is preferable that the image pickup apparatus of the present embodiment include an optical member through which light passes, on the object side of the optical system, and both surfaces of the optical member be curved surfaces.

It is possible to form two spaces by the optical member. For instance, a closed space is formed by the optical member and another member, and the optical system is disposed in the closed space. By making such arrangement, it is possible to carry out imaging of other space stably, independent of an environment of the other space. Imaging by a capsule endoscope is an example of such imaging.

In a capsule endoscope, imaging of various parts in body is carried out. For imaging, a subject has to swallow the capsule endoscope. Therefore, in the capsule endoscope, it is necessary to make the image pickup apparatus water-tight, as well as to minimize a resistance at the time of swallowing and a friction with each organ in the body. For this, it is possible to meet these requirements by making both surfaces of the optical member curved surfaces. In such manner, by making the abovementioned arrangement, it is possible to use the image pickup apparatus of the present embodiment as an image pickup apparatus of a capsule endoscope. Moreover, even for applications other than imaging inside the body, it is possible to protect the optical system by the optical member.

In the image pickup apparatus of the present embodiment, it is preferable that the following conditional expression (17) be satisfied:

$$100 < |Fc/FL| \tag{17}$$

where,

Fc denotes a focal length of the optical member, and

FL denotes the focal length of the overall optical system.

By satisfying conditional expression (17), it is possible to maintain an imaging performance of the optical system to be favorable even when an accuracy of assembling during manufacturing of the optical system is reduced.

An optical apparatus of the present embodiment includes the abovementioned image pickup apparatus and a signal processing circuit.

According to the optical apparatus of the present embodiment, it is possible to achieve an image having a high resolution and a wide angle of view, while being small-sized.

The image pickup apparatus and the optical apparatus described above may satisfy a plurality of arrangements simultaneously. Making such arrangement is preferable for achieving a favorable image pickup apparatus and optical apparatus. Moreover, combinations of preferable arrangements are arbitrary. Furthermore, regarding each conditional expression, only an upper limit value or a lower limit value of a further restricted numerical range of the conditional expression may be restricted.

Examples of an image pickup apparatus according to certain aspects of the present invention will be described below in detail by referring to the accompanying diagrams. However, the present invention is not restricted to the examples described below. An optical system of the image pickup apparatus will be described below. It is assumed that the image sensor is disposed at an image position formed by the optical system.

In diagrams of the examples, FIG. 1A, FIG. 2A, FIG. 3A, FIG. 4A, FIG. 5A, FIG. 6A, FIG. 7A, FIG. 8A, FIG. 9A, FIG. 10A, FIG. 11A, and FIG. 12A are lens cross-sectional views.

FIG. 1B, FIG. 2B, FIG. 3B, FIG. 4B, FIG. 5B, FIG. 6B, FIG. 7B, FIG. 8B, FIG. 9B, FIG. 10B, FIG. 11B, and FIG. 12B show a spherical aberration (SA).

FIG. 1C, FIG. 2C, FIG. 3C, FIG. 4C, FIG. 5C, FIG. 6C, FIG. 7C, FIG. 8C, FIG. 9C, FIG. 10C, FIG. 11C, and FIG. 12C show an astigmatism (AS).

FIG. 1D, FIG. 2D, FIG. 3D, FIG. 4D, FIG. 5D, FIG. 6D, FIG. 7D, FIG. 8D, FIG. 9D, FIG. 10D, FIG. 11D, and FIG. 12D show a distortion (DT).

FIG. 1E, FIG. 2E, FIG. 3E, FIG. 4E, FIG. 5E, FIG. 6E, FIG. 7E, FIG. 8E, FIG. 9E, FIG. 10E, FIG. 11E, and FIG. 12E show a chromatic aberration (CC) of magnification.

An optical system of an example 1 includes in order from an object side, a negative meniscus lens L1 having a convex surface directed toward the object side, a biconvex positive lens L2, and a biconvex positive lens L3.

An aperture stop S is disposed between the biconvex positive lens L2 and the biconvex positive lens L3.

An optical system of an example 2 includes in order from an object side, a negative meniscus lens L1 having a convex surface directed toward the object side, a biconvex positive lens L2, and a biconvex positive lens L3.

An aperture stop S is disposed between the biconvex positive lens L2 and the biconvex positive lens L3.

An aspheric surface is provided to a total of three surfaces which are, an image-side surface of the negative meniscus lens L1, an object-side surface of the biconvex positive lens L2, and an image-side surface of the biconvex positive lens L3.

An optical system of an example 3 includes in order from an object side, a negative meniscus lens L1 having a convex surface directed toward the object side, a biconvex positive lens L2, and a biconvex positive lens L3.

An aperture stop S is disposed between the biconvex positive lens L2 and the biconvex positive lens L3.

An optical system of an example 4 includes in order from an object side, a negative meniscus lens L1 having a convex surface directed toward the object side, a biconvex positive lens L2, and a biconvex positive lens L3.

An aperture stop S is disposed between the biconvex positive lens L2 and the biconvex positive lens L3.

An aspheric surface is provided to a total of four surfaces which are, an image-side surface of the negative meniscus lens L1, both surfaces of the biconvex positive lens L2, and an image-side surface of the biconvex positive lens L3.

An optical system of an example 5 includes in order from an object side, a negative meniscus lens L1 having a convex surface directed toward the object side, a biconvex positive lens L2, and a biconvex positive lens L3.

An aperture stop S is disposed between the biconvex positive lens L2 and the biconvex positive lens L3.

An optical system of an example 6 includes in order from an object side, a negative meniscus lens L1 having a convex surface directed toward the object side, a biconvex positive lens L2, and a biconvex positive lens L3.

An aperture stop S is disposed between the biconvex positive lens L2 and the biconvex positive lens L3.

An aspheric surface is provided to a total of four surfaces which are, an image-side surface of the negative meniscus lens L1, both surfaces of the biconvex positive lens L2, and an image-side surface of the biconvex positive lens L3.

An optical system of an example 7 includes in order from an object side, a negative meniscus lens L1 having a convex surface directed toward the object side, a positive meniscus lens L2 having a convex surface directed toward the object side, and a biconvex positive lens L3.

An aperture stop S is disposed between the positive meniscus lens L2 and the biconvex positive lens L3.

An aspheric surface is provided to a total of three surfaces which are, an image-side surface of the negative meniscus lens L1, an object-side surface of the positive meniscus lens L2, and an image-side surface of the biconvex positive lens L3.

An optical system of an example 8 includes in order from an object side, a negative meniscus lens L1 having a convex surface directed toward the object side, a positive meniscus lens L2 having a convex surface directed toward the object side, and a biconvex positive lens L3.

An aperture stop S is disposed between the positive meniscus lens L2 and the biconvex positive lens L3.

An aspheric surface is provided to a total of three surfaces which are, an image-side surface of the negative meniscus lens L1, an object-side surface of the positive meniscus lens L2, and an image-side surface of the biconvex positive lens L3.

An optical system of an example 9 includes in order from an object side, a negative meniscus lens L1 having a convex surface directed toward the object side, a biconvex positive lens L2, and a biconvex positive lens L3.

An aperture stop S is disposed between the biconvex positive lens L2 and the biconvex positive lens L3.

An aspheric surface is provided to a total of three surfaces which are, an image-side surface of the negative meniscus lens L1, an object-side surface of the biconvex positive lens L2, and an image-side surface of the biconvex positive lens L3.

An optical system of an example 10 includes in order from an object side, a negative meniscus lens L1 having a convex surface directed toward the object side, a biconvex positive lens L2, and a biconvex positive lens L3.

An aperture stop S is disposed between the biconvex positive lens L2 and the biconvex positive lens L3.

An aspheric surface is provided to a total of three surfaces which are, an image-side surface of the negative meniscus lens L1, an object-side surface of the biconvex positive lens L2, and an image-side surface of the biconvex positive lens L3.

An optical system of an example 11 includes in order from an object side, a biconcave negative lens L1, a biconvex positive lens L2, and a biconvex positive lens L3.

An aperture stop S is disposed between the biconvex positive lens L2 and the biconvex positive lens L3.

An aspheric surface is provided to a total of three surfaces which are, an image-side surface of the biconcave negative lens L1, an object-side surface of the biconvex positive lens L2, and an image-side surface of the biconvex positive lens L3.

An optical system of an example 12 includes in order from an object side, a negative meniscus lens L1 having a convex surface directed toward the object side, a biconvex positive lens L2, and a biconvex positive lens L3.

An aperture stop S is disposed between the biconvex positive lens L2 and the biconvex positive lens L3.

An aspheric surface is provided to a total of four surfaces which are, an image-side surface of the negative meniscus lens L1, both surfaces of the biconvex positive lens L2, and an image-side surface of the biconvex positive lens L3.

Figure 13:
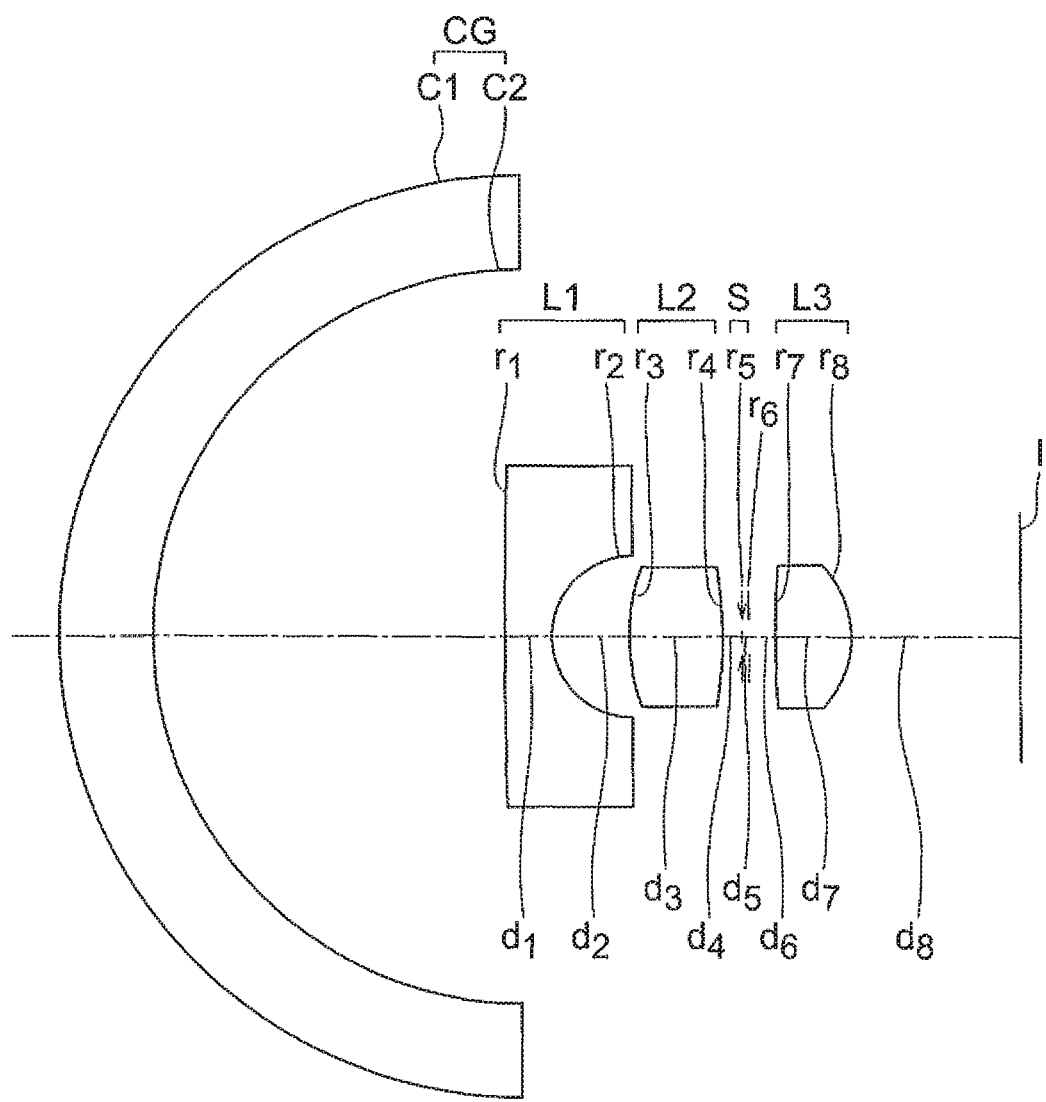
FIG. 13 is a cross-sectional view of an optical system of an example 13.

A wide-angle optical system according to an example 13, as shown in FIG. 13, includes in order from an object side, an optical member CG, a negative meniscus lens L1 having a convex surface directed toward the object side, a biconvex positive lens L2, and a biconvex positive lens L3. The optical system including the negative meniscus lens L1, the biconvex positive lens L2, an aperture stop S, and the biconvex positive lens L3 is same as the optical system according to the example 1.

FIG. 13 is a schematic diagram illustrating that the optical member CG can be disposed. Therefore, a size and a position of the optical member CG have not been depicted accurately with respect to sizes and positions of the lenses.

The optical member CG is a member in the form of a plate, and both an object-side surface and an image-side surface thereof are curved surfaces. In FIG. 13, since both the object-side surface and the image-side surface are curved surfaces, an overall shape of the optical member CG is hemispherical. In the example 13, a thickness of the optical member CG, or in other words, a distance between the object-side surface and the image-side surface, is constant. However, the thickness of the optical member CG may not be constant.

Moreover, as it will be described later, the optical member CG is disposed at a position only 6.31 mm away on the object side from the object-side surface of the first lens. However, the optical member CG may be disposed at a position shifted frontward or rearward from the abovementioned position. Moreover, a radius of curvature and the thickness of the optical member CG mentioned here is an example, and are not limited to the radius of curvature and the thickness mentioned here.

A material that allows light to transmit through has been used for the optical member CG. Consequently, light from an object passes through the optical member CG and is incident on the negative meniscus lens L1. The optical member CG is disposed such that a curvature center of the image-side surface substantially coincides with a position of an entrance pupil. Consequently, a new aberration due to the optical member CG hardly occurs. In other words, an imaging performance of the optical system according to the example 13 is not different from an imaging performance of the optical system according to the example 1.

The optical member CG functions as a cover glass. In this case, the optical member CG corresponds to an observation window provided at an outer covering of a capsule endoscope. Therefore, the optical system according to the example 13 can be used for an optical system of a capsule endoscope. The optical systems according to the example 2 to the example 12 can also be used for an optical system of an endoscope.

Numerical data of each example described above is shown below. In Surface data, r denotes radius of curvature of each lens surface, d denotes a distance between respective lens surfaces, nd denotes a refractive index of each lens for a d-line, vd denotes an Abbe number for each lens and *denotes an aspheric surface, stop denotes an aperture stop.

In surface data of each example, a flat surface is positioned immediately next to a surface indicating a stop. This flat surface indicates an image-side surface of the stop. For example, in the example 1, a fifth surface (r5) is an object-side surface of a stop, and a sixth surface (r6) is an image-side surface of the stop. Therefore, a distance (d5) between the fifth surface and the sixth surface becomes a thickness of the stop. Similar is the case even for the other examples.

Further, in Various data, f denotes a focal length of the entire system, FNO. denotes an F number, ω denotes a half angle of view, IH denotes an image height, LTL denotes a lens total length of the optical system, BF denotes a back focus. Further, back focus is a unit which is expressed upon air conversion of a distance from a rearmost lens surface to a paraxial image surface. The lens total length is a distance from a frontmost lens surface to the rearmost lens surface plus back focus. A unit of the half angle of view is degree.

Moreover, the example 13 is an example in which the optical member CG is disposed on the object side of the image forming optical system according to the example 1. In surface data of the example 13, C1 denotes the object-side surface of the optical member CG and C2 denotes the image-side surface of the optical member CG. Since aspheric surface data and various data of the example 13 are same as aspheric surface data and various data of the example 1, description thereof is omitted here.

A shape of an aspheric surface is defined by the following expression where the direction of the optical axis is represented by z, the direction orthogonal to the optical axis is represented by y, a conical coefficient is represented by K, aspheric surface coefficients are represented by A4, A6, A8, A10, A12 . . . .

$$Z=(y^2/r)/[1+\{1-(1+k)(y/r)^2\}^{1/2}]+A4y^4+A6y^6+A8y^8+A10y^{10}+A12y^{12}+\ldots$$

Further, in the aspheric surface coefficients, 'e-n' (where, n is an integral number) indicates '$10^{-n}$'. Moreover, these symbols are commonly used in the following numerical data for each example.

Example 1

Unit mm

Surface data

| Surface no. | r | d | nd | vd |
|---|---|---|---|---|
| Object plane | ∞ | 15.01 | | |
| 1 | 58.672 | 0.44 | 1.53110 | 56.00 |
| 2 | 0.745 | 0.72 | | |
| 3 | 1.883 | 0.86 | 1.63600 | 23.90 |
| 4 | −4.032 | 0.18 | | |
| 5(Stop) | ∞ | 0.06 | | |
| 6 | ∞ | 0.24 | | |
| 7 | 9.031 | 0.70 | 1.53110 | 56.00 |
| 8 | −0.949 | 1.56 | | |
| Image plane | ∞ | | | |

Various data

| | |
|---|---|
| f | 1.0065 |
| FNO. | 4.78 |
| ω | 79.24 |
| IH | 1.14 |
| LTL | 4.77 |
| BF | 1.56 |
| Φ1L | −1.53 |

Example 2

Unit mm

Surface data

| Surface no. | r | d | nd | vd |
|---|---|---|---|---|
| Object plane | ∞ | 16.26 | | |
| 1 | 63.524 | 0.48 | 1.53110 | 56.00 |
| 2* | 0.763 | 0.87 | | |
| 3* | 1.789 | 1.03 | 1.63600 | 23.90 |
| 4 | −5.059 | 0.19 | | |
| 5(Stop) | ∞ | 0.07 | | |
| 6 | ∞ | 0.27 | | |
| 7 | 4.575 | 0.81 | 1.53110 | 56.00 |
| 8* | −1.094 | 1.53 | | |
| Image plane | ∞ | | | |

Aspheric surface data

2nd surface k = −0.600

3rd surface k = 0.000
A4 = −8.72553e−02, A6 = −1.37801e−01

8th surface k = 0.000
A4 = 3.74746e−03, A6 = 5.66228e−03

Various data

| | |
|---|---|
| f | 1.0062 |
| FNO. | 4.38 |
| ω | 77.51 |
| Φ1L | −1.88 |

-continued

| Unit mm | | |
|---|---|---|
| LTL | 5.24 | |
| BF | 1.53 | |
| IH | 1.24 | |

Example 3

| | | Unit mm | | |
|---|---|---|---|---|
| | | Surface data | | |
| Surface no. | r | d | nd | vd |
| Object plane | ∞ | 15.83 | | |
| 1 | 61.844 | 0.46 | 1.53110 | 56.00 |
| 2 | 0.894 | 0.80 | | |
| 3 | 1.827 | 1.11 | 1.63600 | 23.90 |
| 4 | −4.702 | 0.10 | | |
| 5(Stop) | ∞ | 0.07 | | |
| 6 | ∞ | 0.06 | | |
| 7 | 11.112 | 0.63 | 1.53110 | 56.00 |
| 8 | −0.943 | 1.46 | | |
| Image plane | ∞ | | | |

| Various data | |
|---|---|
| f | 1.0067 |
| FNO. | 4.28 |
| ω | 77.63 |
| IH | 1.21 |
| LTL | 4.7 |
| BF | 1.46 |
| Φ1L | −1.73 |

Example 4

| | | Unit mm | | |
|---|---|---|---|---|
| | | Surface data | | |
| Surface no. | r | d | nd | vd |
| Object plane | ∞ | 15.92 | | |
| 1 | 62.230 | 0.47 | 1.53110 | 56.00 |
| 2* | 1.094 | 0.90 | | |
| 3* | 2.522 | 1.12 | 1.63600 | 23.90 |
| 4* | −26.555 | 0.39 | | |
| 5(Stop) | ∞ | 0.07 | | |
| 6 | ∞ | 0.06 | | |
| 7 | 1.575 | 0.60 | 1.53110 | 56.00 |
| 8* | −1.319 | 1.43 | | |
| Image plane | ∞ | | | |

Aspheric surface data

2nd surface k = −0.600
3rd surface k = 0.000
A4 = −6.56108e−02, A6 = −3.06597e−02
4th surface k = 0.000
A4 = −3.22162e−02, A6 = 3.35773e−02

-continued

| Unit mm | |
|---|---|
| 8th surface | |
| k = 0.000 | |
| A4 = 1.52816e−01, A6 = 2.73336e−01 | |

| Various data | |
|---|---|
| f | 1.0056 |
| FNO. | 4.17 |
| ω | 76.17 |
| IH | 1.21 |
| LTL | 5.04 |
| BF | 1.43 |
| Φ1L | −2.11 |

Example 5

| | | Unit mm | | |
|---|---|---|---|---|
| | | Surface data | | |
| Surface no. | r | d | nd | vd |
| Object plane | ∞ | 15.75 | | |
| 1 | 61.561 | 0.46 | 1.53110 | 56.00 |
| 2 | 1.079 | 1.00 | | |
| 3 | 1.825 | 1.11 | 1.65100 | 21.50 |
| 4 | −13.820 | 0.19 | | |
| 5(Stop) | ∞ | 0.07 | | |
| 6 | ∞ | 0.06 | | |
| 7 | 5.200 | 0.68 | 1.53110 | 56.00 |
| 8 | −0.939 | 1.36 | | |
| Image plane | ∞ | | | |

| Various data | |
|---|---|
| f | 1.006 |
| FNO. | 3.25 |
| ω | 77.29 |
| IH | 1.2 |
| LTL | 4.92 |
| BF | 1.36 |
| Φ1L | −2.03 |

Example 6

| | | Unit mm | | |
|---|---|---|---|---|
| | | Surface data | | |
| Surface no. | r | d | nd | vd |
| Object plane | ∞ | 15.96 | | |
| 1 | 62.373 | 0.47 | 1.53110 | 56.00 |
| 2* | 0.967 | 0.69 | | |
| 3* | 2.629 | 0.93 | 1.63600 | 23.90 |
| 4* | −25.439 | 0.06 | | |
| 5(Stop) | ∞ | 0.07 | | |
| 6 | ∞ | 0.06 | | |
| 7 | 1.397 | 0.61 | 1.53110 | 56.00 |
| 8* | −1.235 | 1.42 | | |
| Image plane | ∞ | | | |

Aspheric surface data

2nd surface k = −0.600

-continued

Unit mm

3rd surface k = 0.000
A4 = −2.49050e−01, A6 = 2.33065e−02
4th surface k = 0.000
A4 = −4.78113e−02, A6 = −1.50480e+00
8th surface k = 0.000
A4 = 1.90670e−01, A6 = 5.81133e−01

Various data

| | |
|---|---|
| f | 1.0061 |
| FNO. | 4.10 |
| ω | 76.98 |
| IH | 1.22 |
| LTL | 4.31 |
| BF | 1.42 |
| Φ1L | −1.61 |

Example 7

Unit mm

Surface data

| Surface no. | r | d | nd | νd |
|---|---|---|---|---|
| Object plane | ∞ | 17.90 | | |
| 1 | 69.932 | 0.52 | 1.53110 | 56.00 |
| 2* | 0.966 | 1.23 | | |
| 3* | 1.888 | 0.93 | 1.65100 | 21.50 |
| 4 | 11.145 | 0.30 | | |
| 5(Stop) | ∞ | 0.08 | | |
| 6 | ∞ | 0.26 | | |
| 7 | 2.318 | 0.98 | 1.53110 | 56.00 |
| 8* | −1.169 | 1.52 | | |
| Image plane | ∞ | | | |

Aspheric surface data

2nd surface k = −0.500
3rd surface k = 0.000
A4 = 3.65500e−07, A6 = 1.86844e−07
8th surface k = 0.000
A4 = 2.94940e−02, A6 = 1.91968e−01

Various data

| | |
|---|---|
| f | 1.0055 |
| FNO. | 2.74 |
| ω | 76.82 |
| IH | 1.36 |
| LTL | 5.82 |
| BF | 1.52 |
| Φ1L | −2.48 |

Example 8

Unit mm

Surface data

| Surface no. | r | d | nd | νd |
|---|---|---|---|---|
| Object plane | ∞ | 16.04 | | |
| 1 | 62.673 | 0.47 | 1.53110 | 56.00 |
| 2* | 0.752 | 0.92 | | |
| 3* | 1.310 | 0.78 | 1.63600 | 23.90 |
| 4 | 7.008 | 0.63 | | |
| 5(Stop) | ∞ | 0.07 | | |
| 6 | ∞ | 0.08 | | |
| 7 | 1.108 | 1.04 | 1.53110 | 56.00 |
| 8* | −2.318 | 1.18 | | |
| Image plane | ∞ | | | |

Aspheric surface data

2nd surface k = −0.600
3rd surface k = 0.000
A4 = −1.22357e−01, A6 = 2.87081e−02
8th surface k = 0.000
A4 = −2.20326e−01, A6 = 9.82464e−01

Various data

| | |
|---|---|
| f | 1.0057 |
| FNO. | 4.38 |
| ω | 67.18 |
| IH | 1.22 |
| LTL | 5.17 |
| BF | 1.18 |
| Φ1L | −2.10 |

Example 9

Unit mm

Surface data

| Surface no. | r | d | nd | νd |
|---|---|---|---|---|
| Object plane | ∞ | 16.58 | | |
| 1 | 64.797 | 0.49 | 1.53110 | 56.00 |
| 2* | 1.181 | 1.21 | | |
| 3* | 1.926 | 1.16 | 1.65100 | 21.50 |
| 4 | −330.631 | 0.07 | | |
| 5(Stop) | ∞ | 0.07 | | |
| 6 | ∞ | 0.08 | | |
| 7 | 4.688 | 0.76 | 1.53110 | 56.00 |
| 8* | −0.948 | 1.39 | | |
| Image plane | ∞ | | | |

Aspheric surface data

2nd surface k = −0.500
3rd surface k = 0.000
A4 = −4.20293e−02, A6 = −7.59411e−02

-continued

| Unit mm | | | | |
|---|---|---|---|---|
| 8th surface | | | | | k = 0.000
A4 = 1.45942e−03, A6 = −2.48153e−02

| Various data | |
|---|---|
| f | 1.006 |
| FNO. | 3.37 |
| ω | 78.70 |
| IH | 1.26 |
| LTL | 5.24 |
| BF | 1.39 |
| Φ1L | −2.28 |

Example 10

| Unit mm | | | | |
|---|---|---|---|---|
| Surface data | | | | |
| Surface no. | r | d | nd | vd |
| Object plane | ∞ | 16.16 | | |
| 1 | 63.155 | 0.47 | 1.53110 | 56.00 |
| 2* | 0.811 | 0.85 | | |
| 3* | 1.220 | 1.14 | 1.63600 | 23.90 |
| 4 | −10.502 | 0.12 | | |
| 5(Stop) | ∞ | 0.07 | | |
| 6 | ∞ | 0.12 | | |
| 7 | 1.755 | 0.72 | 1.53110 | 56.00 |
| 8* | −1.658 | 1.09 | | |
| Image plane | ∞ | | | |

| Aspheric surface data |
|---|
| 2nd surface | k = −0.600
3rd surface k = 0.000
A4 = −1.51681e−01, A6 = −8.40436e−02
8th surface k = 0.000
A4 = −1.77567e−01, A6 = 4.54011e−01

| Various data | |
|---|---|
| f | 1.0069 |
| FNO. | 2.86 |
| ω | 76.61 |
| IH | 1.23 |
| LTL | 4.59 |
| BF | 1.09 |
| Φ1L | −2.06 |

Example 11

| Unit mm | | | | |
|---|---|---|---|---|
| Surface data | | | | |
| Surface no. | r | d | nd | vd |
| Object plane | ∞ | 16.24 | | |
| 1 | −245.415 | 0.48 | 1.53110 | 56.00 |

-continued

| Unit mm | | | | |
|---|---|---|---|---|
| 2* | 1.163 | 2.01 | | |
| 3* | 1.968 | 0.83 | 1.63600 | 23.90 |
| 4 | −7.990 | 0.59 | | |
| 5(Stop) | ∞ | 0.07 | | |
| 6 | ∞ | 0.26 | | |
| 7 | 1.700 | 0.97 | 1.53110 | 56.00 |
| 8* | −2.828 | 1.10 | | |
| Image plane | ∞ | | | |

| Aspheric surface data |
|---|
| 2nd surface | k = −0.600
3rd surface k = 0.000
A4 = −4.81834e−02, A6 = −1.48225e−02
8th surface k = 0.000
A4 = −4.90845e−02, A6 = 1.26506e−01

| Various data | |
|---|---|
| f | 1.0067 |
| FNO. | 3.49 |
| ω | 78.74 |
| IH | 1.24 |
| LTL | 6.30 |
| BF | 1.10 |
| Φ1L | −2.82 |

Example 12

| Unit mm | | | | |
|---|---|---|---|---|
| Surface data | | | | |
| Surface no. | r | d | nd | vd |
| Object plane | ∞ | 15.95 | | |
| 1 | 33.632 | 0.47 | 1.53110 | 56.00 |
| 2* | 0.998 | 0.73 | | |
| 3* | 3.086 | 0.77 | 1.61000 | 27.00 |
| 4* | −6.004 | 0.15 | | |
| 5(Stop) | ∞ | 0.07 | | |
| 6 | ∞ | 0.06 | | |
| 7 | 1.591 | 0.61 | 1.53110 | 56.00 |
| 8* | −1.230 | 1.41 | | |
| Image plane | ∞ | | | |

| Aspheric surface data |
|---|
| 2nd surface | k = −0.600
3rd surface k = 0.000
A4 = −3.05165e−01, A6 = 5.85356e−02
4th surface k = 0.000
A4 = −1.81842e−01, A6 = 4.01074e−01
8th surface k = 0.000
A4 = 1.69259e−01, A6 = 3.78897e−01

-continued

| Unit mm | |
|---|---|
| Various data | |
| f | 1.0063 |
| FNO. | 3.84 |
| ω | 75.84 |
| IH | 1.22 |
| LTL | 4.27 |
| BF | 1.41 |
| Φ1L | −1.67 |

Example 13

| Unit mm | | | | |
|---|---|---|---|---|
| Surface data | | | | |
| Surface no. | r | d | nd | vd |
| Object plane | ∞ | 8.20 | | |
| C1 | 7.032 | 0.50 | 1.58500 | 30.00 |
| C2 | 6.536 | 6.31 | | |
| 1 | 58.672 | 0.44 | 1.53110 | 56.00 |
| 2 | 0.745 | 0.72 | | |
| 3 | 1.883 | 0.86 | 1.63600 | 23.90 |
| 4 | −4.032 | 0.18 | | |
| 5(Stop) | ∞ | 0.06 | | |
| 6 | ∞ | 0.24 | | |
| 7 | 9.031 | 0.70 | 1.53110 | 56.00 |
| 8 | −0.949 | 1.56 | | |
| Image plane | ∞ | | | |

| Various data | |
|---|---|
| fc | 252.25 |

Next, values for conditional expressions in each example will be shown. Since an optical member CG has not been disposed in the optical systems of examples 1 to 12, values for conditional expression (17) are mentioned only in the example 13. The optical member CG in the example 13 may be used in the optical systems of examples 1 to 12.

| | Example1 | Example2 | Example3 | Example4 |
|---|---|---|---|---|
| (1)Σd/FL | 3.18 | 3.69 | 3.22 | 3.59 |
| (2)Φ1L/IH | 1.34 | 1.52 | 1.43 | 1.74 |
| (3)f2/f3 | 1.29 | 1.26 | 1.33 | 2.52 |
| (6)(R3L + R3R)/(R3L − R3R) | 0.81 | 0.61 | 0.84 | 0.09 |
| (7)f1/FL | −1.42 | −1.45 | −1.70 | −2.09 |
| (8)(R1L + R1R)/(R1L − R1R) | 1.03 | 1.02 | 1.03 | 1.04 |
| (9)D1Ls/FL | 2.18 | 2.56 | 2.64 | 2.86 |
| (10)f1/R1L | −0.02 | −0.02 | −0.03 | −0.03 |
| (11)αmax − αmin | 7.60E−06 | 7.60E−06 | 7.60E−06 | 7.60E−06 |
| (12)nd1/nd2 | 0.94 | 0.94 | 0.94 | 0.94 |
| (13)vd1 − vd2 | 32.1 | 32.1 | 32.1 | 32.1 |
| (14)Σd/Dmaxair | 4.46 | 4.28 | 4.03 | 4.00 |
| (15)D2/FL | 0.85 | 1.03 | 1.11 | 1.11 |
| (16)f2/FL | 2.12 | 2.19 | 2.20 | 3.66 |

| | Example5 | Example6 | Example7 | Example8 |
|---|---|---|---|---|
| (1)Σd/FL | 3.55 | 2.88 | 4.27 | 3.97 |
| (2)ΦL/IH | 1.69 | 1.32 | 1.82 | 1.72 |
| (3)f2/f3 | 1.64 | 2.83 | 2.07 | 1.53 |
| (6)(R3L + R3R)/(R3L − R3R) | 0.69 | 0.06 | 0.33 | −0.35 |
| (7)f1/FL | −2.06 | −1.84 | −1.84 | −1.43 |
| (8)(R1L + R1R)/(R1L − R1R) | 1.04 | 1.03 | 1.03 | 1.02 |
| (9)D1Ls/FL | 2.74 | 2.14 | 2.97 | 2.79 |
| (10)f1/R1L | −0.03 | −0.03 | −0.03 | −0.02 |
| (11)αmax − αmin | 7.60E−06 | 7.60E−06 | 7.60E−06 | 7.60E−06 |
| (12)nd1/nd2 | 0.93 | 0.94 | 0.93 | 0.94 |
| (13)vd1 − vd2 | 34.5 | 32.1 | 34.5 | 32.1 |
| (14)Σd/Dmaxair | 3.55 | 4.17 | 3.49 | 4.33 |
| (15)D2/FL | 1.10 | 0.93 | 0.92 | 0.77 |
| (16)f2/FL | 2.53 | 3.77 | 3.34 | 2.39 |

| | Example9 | Example10 | Example11 | Example12 |
|---|---|---|---|---|
| (1)Σd/FL | 3.83 | 3.47 | 5.17 | 2.84 |
| (2)Φ1L/IH | 1.80 | 1.69 | 2.28 | 1.37 |
| (3)f2/f3 | 1.89 | 1.03 | 1.19 | 2.44 |
| (6)(R3L + R3R)/(R3L − R3R) | 0.66 | 0.03 | −0.25 | 0.13 |
| (7)f1/FL | −2.26 | −1.54 | −2.16 | −1.93 |
| (8)(R1L + R1R)/(R1L − R1R) | 1.04 | 1.03 | 0.99 | 1.06 |
| (9)D1Ls/FL | 2.91 | 2.56 | 3.88 | 2.10 |
| (10)f1/R1L | −0.04 | −0.02 | 0.01 | −0.06 |
| (11)αmax − αmin | 7.60E−06 | 7.60E−06 | 7.60E−06 | 1.31E−05 |
| (12)nd1/nd2 | 0.93 | 0.94 | 0.94 | 0.95 |
| (13)vd1 − vd2 | 34.5 | 32.1 | 32.1 | 29.0 |
| (14)Σd/Dmaxair | 3.18 | 4.11 | 2.59 | 3.93 |
| (15)D2/FL | 1.15 | 1.13 | 0.83 | 0.77 |
| (16)f2/FL | 2.93 | 1.77 | 2.55 | 3.43 |

| | Example13 |
|---|---|
| (1)Σd/FL | 3.18 |
| (2)Φ1L/IH | 1.34 |
| (3)f2/f3 | 1.29 |
| (6)(R3L + R3R)/(R3L − R3R) | 0.81 |
| (7)f1/FL | −1.42 |
| (8)(R1L + R1R)/(R1L − R1R) | 1.03 |
| (9)D1Ls/FL | 2.18 |
| (10)f1/R1L | −0.02 |
| (11)αmax − αmin | 7.60E−06 |
| (12)nd1/nd2 | 0.94 |
| (13)vd1 − vd2 | 32.1 |
| (14)Σd/Dmaxair | 4.46 |
| (15)D2/FL | 0.85 |
| (16)f2/FL | 2.12 |
| (17)|Fc/FL| | 252.09 |

Figure 14:
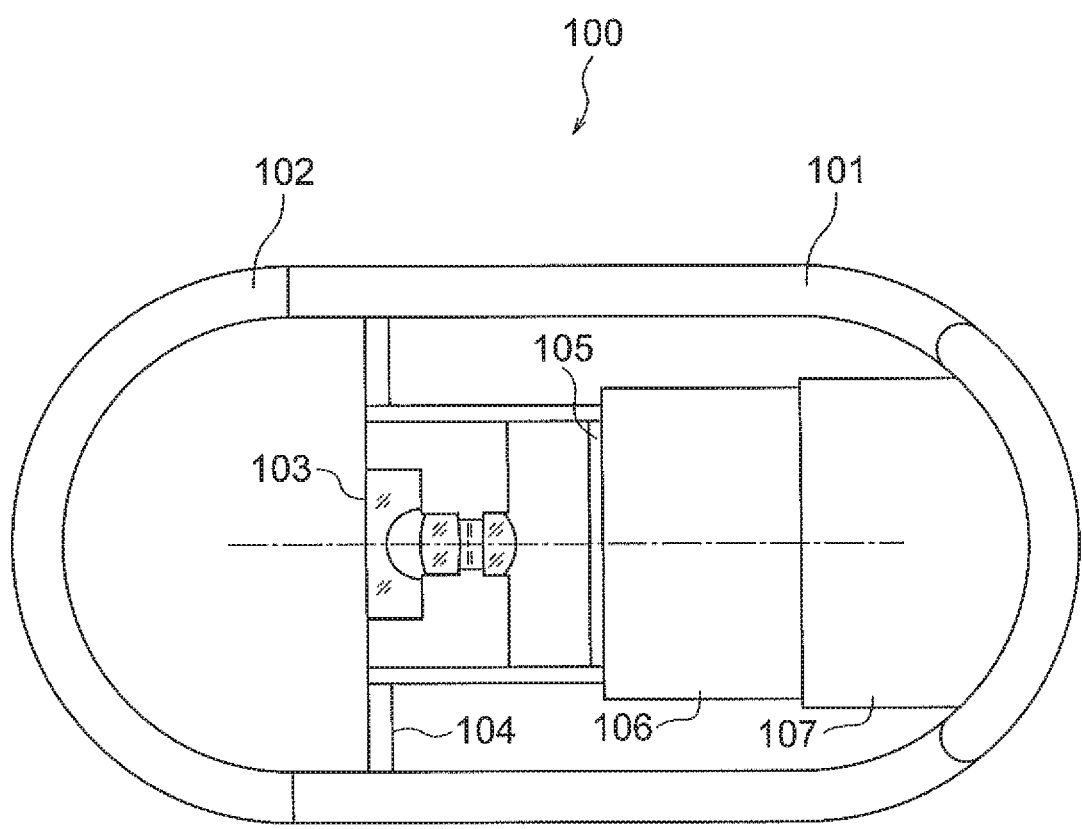
FIG. 14 is a diagram showing a schematic arrangement of a capsule endoscope.

FIG. 14 illustrates an example of an image pickup apparatus. In this example, the image pickup apparatus is a capsule endoscope. A capsule endoscope 100 includes a capsule cover 101 and a transparent cover 102. An outer covering of the capsule endoscope 100 is formed by the capsule cover 101 and the transparent cover 102.

The capsule cover 101 includes a central portion having a substantially circular cylindrical shape, and a bottom portion having a substantially bowl shape. The transparent cover 102 is disposed at a position facing the bottom portion, across the central portion. The transparent cover 102 is formed by a transparent member having a substantially bowl shape. The capsule cover 101 and the transparent cover 102 are connected consecutively to be mutually watertight.

An interior of the capsule endoscope 100 includes an image forming optical system 103, an illumination unit 104, an image sensor 105, a drive control unit 106, and a signal processing unit 107. Although it is not shown in the diagram, the interior of the capsule endoscope 100 is provided with an electric-power receiving unit and a transmitting unit.

Illumination light is irradiated from the illumination unit 104. The illumination light passes through the transparent cover 102 and is irradiated to an object. Light from the object is incident on the image forming optical system 103. An optical image of the object is formed at an image position by the image forming optical system 103.

The optical image is picked up by the image sensor 105. A drive and control of the image sensor 105 is carried out by the drive control unit 106. Moreover, an output signal from the image sensor 105 is processed by the signal processing unit 107 according to the requirement.

Here, for the image forming optical system 103, the optical system according to the abovementioned example 1 for instance, is used. In such manner, the image forming optical system 103 has a wide angle of view and in which various aberrations are corrected favorably, while being small-sized. Consequently, in the image forming optical system 103, a wide-angle optical image having a high resolution is acquired.

Moreover, the capsule endoscope 100 includes an optical system having a wide angle of view and in which various aberrations are corrected favorably, while being small-sized. Consequently, in the capsule endoscope 100, it is possible to acquire a wide-angle image with high resolution, while being small-sized.

Figure 15A:
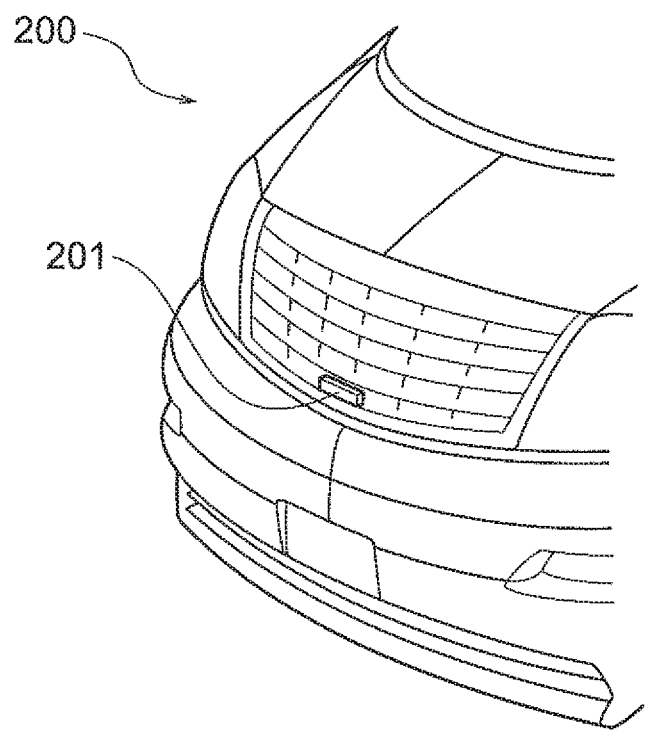
FIG. 15A and FIG. 15B are diagrams showing a car-mounted camera.
Figure 15B:
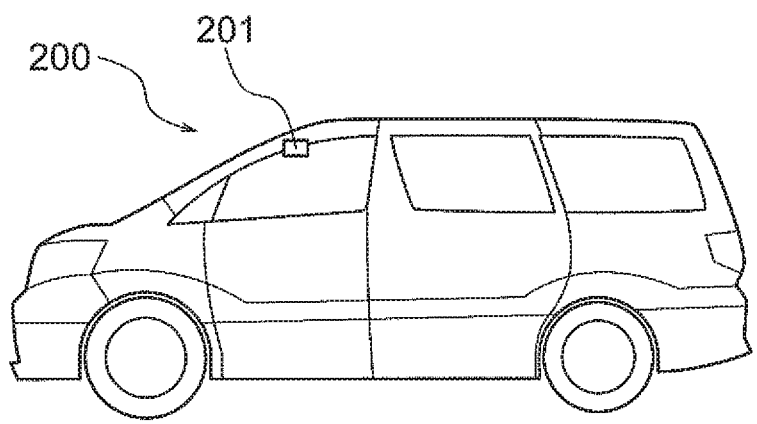

FIG. 15A and FIG. 15B are diagrams illustrating another example of an image pickup apparatus. In this example, the image pickup apparatus is a car-mounted camera. FIG. 15A is a diagram illustrating an example of a car-mounted camera mounted at an outside of a car, and FIG. 15B is a diagram illustrating an example of a car-mounted camera mounted inside a car.

As shown in FIG. 15A, a car-mounted camera 201 is provided to a front grill of an automobile 200. The car-mounted camera 201 includes an image forming optical system and an image sensor.

For the image forming optical system of the car-mounted camera 201, the optical system according to the abovementioned example 1 is used. Consequently, an optical image of an extremely wide range (the angle of view of about 160°) is formed.

As shown in FIG. 15B, the car-mounted camera 201 is provided near a ceiling of the automobile 200. An action and an effect of the car-mounted camera 201 are as have already been described. In the car-mounted camera 201, while being small-sized, it is possible to acquire a wide-angle image with high resolution.

According to the image pickup apparatus of the present embodiment, it is possible to provide an image pickup apparatus equipped with an optical system which, while being small-sized, has a wide angle and of view, and in which various aberrations are corrected favorably. Moreover, it is possible to provide an optical apparatus which, while being small-sized, is capable of achieving a high-resolution wide-angle optical image.

As described above, the image pickup apparatus according to the present invention is suitable for an image pickup apparatus which, while being small-sized, has a wide angle of view, and in which various aberrations are corrected favorably. Moreover, the optical apparatus according to the present invention is suitable for an optical apparatus which, while being small-sized, is capable of achieving a high-resolution wide-angle optical image.

What is claimed is:

1. An image pickup apparatus, comprising:
an optical system which includes a plurality of lenses; and
an image sensor which is disposed at an image position of the optical system, wherein:
the optical system includes in order from an object side:
a first lens having a negative refractive power,
a second lens having a positive refractive power,
an aperture stop, and
a third lens,
the aperture stop is disposed between an image side surface of the second lens and an object side surface of the third lens, and is separated from both the image side surface of the second lens and the object side surface of the third lens so as not to be in contact with the second lens and the third lens,
each of the first lens, the second lens, and the third lens is formed of a material having a refractive index not higher than 1.70, and
the following conditional expressions (1) and (2) are satisfied:

$$2.0 < \Sigma d/FL < 5.5 \qquad (1), \text{ and}$$

$$0.5 < \Phi 1L/IH < 3.0 \qquad (2)$$

where:
$\Sigma d$ denotes a distance from an object-side surface of the first lens up to a lens surface positioned nearest to image,
FL denotes a focal length of the overall optical system,
IH denotes a maximum image height, and
$\Phi 1L$ denotes an effective aperture at the object-side surface of the first lens.

2. The image pickup apparatus according to claim 1, wherein a surface nearest to object of the third lens is a convex surface directed toward the object.

3. The image pickup apparatus according to claim 1, wherein a half angle of view is not less than 65 degrees.

4. The image pickup apparatus according to claim 1, wherein the following conditional expression (3) is satisfied:

$$0.7 < f2/f3 < 5 \qquad (3),$$

where:
f2 denotes a focal length of the second lens, and
f3 denotes a focal length of the third lens.

5. The image pickup apparatus according to claim 1, wherein:
in an orthogonal coordinate system in which a horizontal axis is let to be vd2 and a vertical axis is let to be θgF2,
when a straight line expressed by θgF2=αp×vd2+β, where αp=−0.005 is set,
vd2 and θgF2 of the second lens are included in both of an area determined by the straight line in which a value of β is a lower limit value of a range of the following conditional expression (4) and the straight line in which a value of β is an upper limit value of the range of the following conditional expression (4), and an area determined by the following conditional expression (5):

$$0.750 < \beta < 0.775 \qquad (4), \text{ and}$$

$$12 < vd2 < 30 \qquad (5),$$

where:
θF2 denotes a partial dispersion ratio (ng2−nF2)/(nF2−nC2) of the second lens,
vd2 denotes Abbe number (nd−1)/(nF−nC) for the second lens, and
nd, nC2, nF2, and ng2 are refractive indices of the second lens for a d-line, a C-line, an F-line, and a g-line respectively.

6. The image pickup apparatus according to claim 1, wherein the following conditional expression (6) is satisfied:

$$-1.5 < (R3L+R3R)/(R3L-R3R) < 2 \qquad (6),$$

where:
R3L denotes a paraxial radius of curvature of an object-side surface of the third lens, and
R3R denotes a paraxial radius of curvature of an image-side surface of the third lens.

7. The image pickup apparatus according to claim 1, wherein the following conditional expression (7) is satisfied:

$$-4.0<f1/FL<-1.0 \qquad (7),$$

where:
f1 denotes a focal length of the first lens, and
FL denotes the focal length of the overall optical system.

8. The image pickup apparatus according to claim 1, wherein the following conditional expression (8) is satisfied:

$$0.8<(R1L+R1R)/(R1L-R1R)<1.2 \qquad (8),$$

where:
R1L denotes a paraxial radius of curvature of the object-side surface of the first lens, and
R1R denotes a paraxial radius of curvature of an image-side surface of the first lens.

9. An image pickup apparatus according to claim 1, wherein the following conditional expression (9) is satisfied:

$$1.5<D1Ls/FL<5 \qquad (9),$$

where:
D1Ls denotes a distance from the object-side surface of the first lens up to the aperture stop, and
FL denotes the focal length of the overall optical system.

10. The image pickup apparatus according to claim 1, wherein the following conditional expression (10) is satisfied:

$$-0.1<f1/R1L<0.1 \qquad (10),$$

where:
R1L denotes a paraxial radius of curvature of an object-side surface of the first lens, and
f1 denotes a focal length of the first lens.

11. The image pickup apparatus according to claim 1, wherein the following conditional expression (11) is satisfied:

$$\alpha max-\alpha min<4.0\times10^{-5}/°\ C. \qquad (11),$$

where:
α max denotes a largest coefficient of linear expansion among coefficients of linear expansion at 20 degrees of the plurality of lenses, and
α min denotes a smallest coefficient of linear expansion among coefficients of linear expansion at 20 degrees of the plurality of lenses.

12. The image pickup apparatus according to claim 1, wherein the following conditional expression (12) is satisfied:

$$0.85<nd1/nd2<1 \qquad (12),$$

where:
nd1 denotes a refractive index for the d-line of the first lens, and
nd2 denotes a refractive index for the d-line of the second lens.

13. The image pickup apparatus according to claim 1, wherein the following conditional expression (13) is satisfied:

$$15.0<vd1-vd2<40.0 \qquad (13),$$

where:
vd1 denotes Abbe number for the first lens, and
vd2 denotes Abbe number for the second lens.

14. The image pickup apparatus according to claim 1, wherein the following conditional expression (14) is satisfied:

$$2.0<\Sigma d/D maxair<7 \qquad (14),$$

where:
Σd denotes the distance from the lens surface positioned nearest to object up to the lens surface positioned nearest to image, and
Dmaxair denotes a largest air space among air spaces between the lens surface positioned nearest to object and the lens surface positioned nearest to image.

15. The image pickup apparatus according to claim 1, wherein the following conditional expression (15) is satisfied:

$$0.25<D2/FL<2 \qquad (15),$$

where:
D2 denotes a thickness of the second lens, and
FL denotes the focal length of the overall optical system.

16. The image pickup apparatus according to claim 1, wherein the following conditional expression (16) is satisfied:

$$1.2<f2/FL<5 \qquad (16),$$

where:
f2 denotes a focal length of the second lens, and
FL denotes the focal length of the overall optical system.

17. The image pickup apparatus according to claim 1, further comprising:
an optical member through which light passes, on the object side of the optical system,
wherein both surfaces of the optical member are curved surfaces.

18. The image pickup apparatus according to claim 15, wherein the following conditional expression (17) is satisfied:

$$100<|Fc/FL| \qquad (17),$$

where:
Fc denotes a focal length of the optical member, and
FL denotes the focal length of the overall optical system.

19. An optical apparatus, comprising:
an image pickup apparatus according to claim 1; and
a signal processing circuit.

20. The image pickup apparatus according to claim 1, wherein the third lens has a positive refractive power.

* * * * *